US012645925B2

(12) United States Patent
Shin et al.

(10) Patent No.:    US 12,645,925 B2
(45) Date of Patent:         Jun. 2, 2026

(54) DUAL-SPARSE NEURAL PROCESSING UNIT WITH MULTI-DIMENSIONAL ROUTING OF NON-ZERO VALUES

(71) Applicant: Samsung Electronics Co., Ltd., Suwon-si (KR)

(72) Inventors: Jong Hoon Shin, San Jose, CA (US); Ali Shafiee Ardestani, San Jose, CA (US); Joseph H. Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1153 days.

(21) Appl. No.: 17/521,840

(22) Filed: Nov. 8, 2021

(65) Prior Publication Data

US 2022/0156568 A1      May 19, 2022

Related U.S. Application Data

(60) Provisional application No. 63/113,820, filed on Nov. 13, 2020.

(51) Int. Cl.
G06N 3/06         (2006.01)
G06F 7/544        (2006.01)
(Continued)

(52) U.S. Cl.
CPC ........... G06N 3/063 (2013.01); G06F 7/5443 (2013.01); G06F 17/16 (2013.01)

(58) Field of Classification Search
CPC .............................. G06N 3/063; G06F 7/5443
See application file for complete search history.

(56) References Cited

U.S. PATENT DOCUMENTS 11,100,193 B2      8/2021  Gu et al.
2018/0315158 A1*  11/2018  Nurvitadhi ................ G06T 1/20
(Continued)

FOREIGN PATENT DOCUMENTS

JP          2020091853 A      6/2020
KR       20200070088 A      6/2020

OTHER PUBLICATIONS

Delmas Lascorz, Alberto et al., "Bit-Tactical: A Software/Hardware Approach to Exploiting Value and Bit Sparsity in Neural Networks," Proceedings of the Twenty-Fourth International Conference on Architectural Support for Programming Languages and Operating Systems, 2019, pp. 749-763.

(Continued)

*Primary Examiner* — Van C Mang
(74) *Attorney, Agent, or Firm* — Renaissance IP Law Group LLP

(57)                    ABSTRACT

A general matrix-matrix (GEMM) accelerator core includes first and second buffers, a control logic circuit, and a first processing element (PE). The first buffer receives a elements of a first matrix A of activation values. The second buffer receives b elements of a second matrix B of weight values. The control logic circuit replaces a zero-valued a element in a first column of the first buffer with a nonzero-valued a element that is within a maximum borrowing distance of a location of the zero-valued a element in the first column of the first buffer. The PE receives a elements from the first column of the first buffer including the nonzero-valued element a selected to replace the zero-valued a element and receives b elements from locations in the second buffer that correspond to locations in the first buffer from where the a elements have been received by the PE.

20 Claims, 14 Drawing Sheets

(51) Int. Cl.
    *G06F 17/16*        (2006.01)
    *G06N 3/063*        (2023.01)

(56) References Cited

U.S. PATENT DOCUMENTS

| | | | |
|---|---|---|---|
| 2019/0041961 A1 | 2/2019 | Desai et al. | |
| 2021/0110508 A1* | 4/2021 | Mellempudi | .......... G06N 3/092 |

OTHER PUBLICATIONS

Gondimalla, Ashish et al., "SparTen: A Sparse Tensor Accelerator for Convolutional Neural Networks," Proceedings of the 52nd Annual IEEE/ACM International Symposium on Microarchitecture, 2019, pp. 151-165.
Office Action for U.S. Appl. No. 17/521,846, mailed May 1, 2025.
Notice of Allowance for U.S. Appl. No. 17/521,846, mailed Dec. 23, 2025.

\* cited by examiner

200

$(da_1, da_2, da_3, db_1, db_2, db_3) = (2,0,0,2,0,1)$

200

$(db_1, db_2, db_3) = (8,0,1)$

200

$(da_1, da_2, da_3) = (2,1,1)$

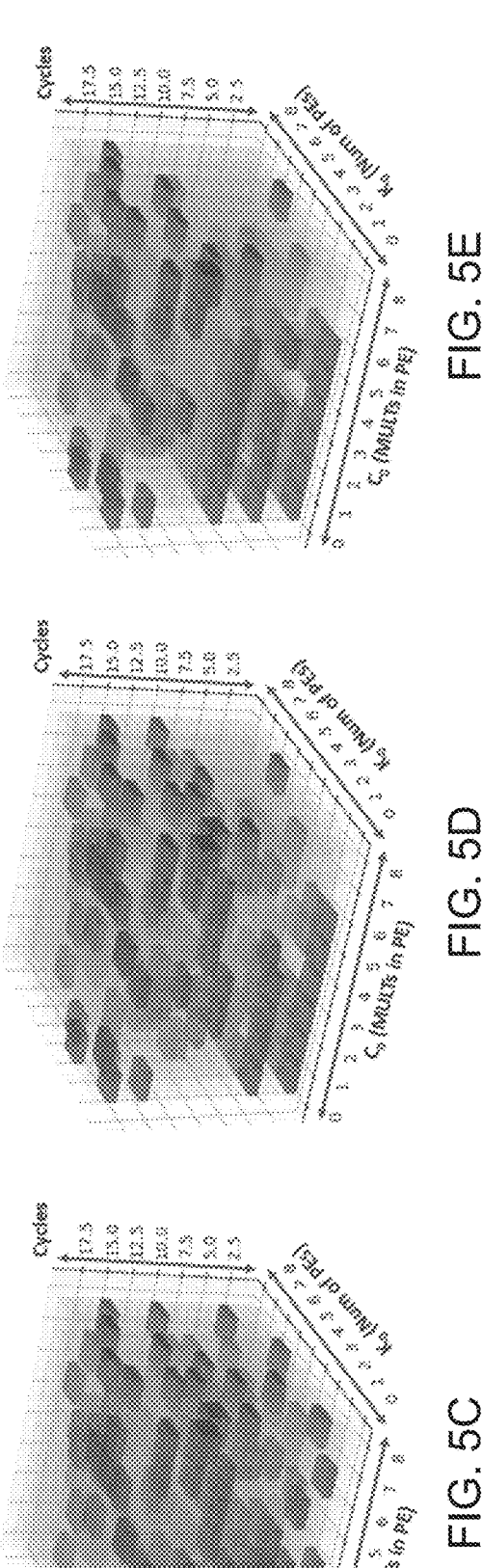
FIG. 5E
FIG. 5D
FIG. 5C
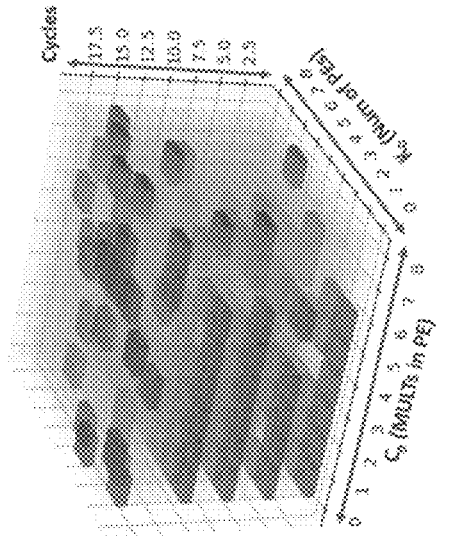
FIG. 5G
FIG. 5F

DUAL-SPARSE NEURAL PROCESSING UNIT WITH MULTI-DIMENSIONAL ROUTING OF NON-ZERO VALUES

CROSS-REFERENCE TO RELATED APPLICATION

This application claims the priority benefit under 35 U.S.C. § 119(e) of U.S. Provisional Application No. 63/113,820, filed on Nov. 13, 2020, the disclosure of which is incorporated herein by reference in its entirety.

TECHNICAL FIELD

The subject matter disclosed herein relates to neural networks. More particularly, the subject matter disclosed here relates to an accelerator core for a neural network.

BACKGROUND

In deep neural networks (DNNs), rectified linear units (ReLUs) and weight pruning enable accelerators to reduce the number of ineffectual computations (i.e., computations having at least one zero operand). ReLUs may be used to induce sparsity in activation tensors by zeroing out negative elements. Weight pruning may be used to induce sparsity in weight tensors by pruning insignificant weights. Although both approaches have shown promising results in several applications, ReLUs and/or weight pruning may not always be enabled. For example, to improve DNN accuracy, a DNN developer may prefer dense non-linear activation functions, which do not having as many zeros. Similarly, weight pruning may be disabled because it tends to significantly increase training time, reduces network accuracy, and/or because the network is already pre-trained dense. Thus, both activation and weight tensors may be dense or sparse, and DNN models and execution modes may be grouped into four categories based on (activation, weight) tensor types: (dense/dense), (dense/sparse), (sparse/dense), and (sparse/sparse).

An accelerator may be specifically optimized for one of the four different category types. DNN model categories, however, are usually unknown at design time for inference accelerators and it may be useful to switch between different modes, or categories, during training. An optimal design point to run a particular category of DNNs is only optimal for the same type of DNN model. That is, DNN architectures that are optimized for weight-only sparsity are not as efficient for activation-only sparsity models (i.e., (sparse, dense)) and may not fully take advantage of a dual sparse category model (i.e., (sparse, sparse)).

For situations in which area and power have strict budgets, it may be challenging to efficiently support all categories of workloads, particularly if both compute units and the associated random access memory (RAM) have been optimized for a specific category so that the overhead for sparse processing becomes significant beyond the overhead for dense processing.

SUMMARY

An example embodiment provides a general matrix-matrix (GEMM) accelerator core that may include a first buffer, a second buffer, a control logic circuit, and a first processing element (PE). The first buffer may include $K_0$ rows and $K_1$ columns of locations in which $K_0$ and $K_1$ are integers greater than 1, and the first buffer may be configured to receive a elements of a first matrix A of activation values. The second buffer may include $K_1$ rows and $K_0$ columns of locations, and the second buffer may be configured to receive b elements of a second matrix B of weight values. The control logic circuit may be coupled to the first buffer, and may be configured to select a first nonzero-valued a element based a first zero-valued a element being in a first column of the first buffer and to replace the first zero-valued a element with the first nonzero-value a element in which the first nonzero-valued a element may be selected to replace the first zero-valued a element in the first column of the first buffer by being within a maximum borrowing distance of a first location of the first zero-valued a element in the first column of the first buffer. The first PE may include an array of $K_0$ multipliers. The first PE may also be associated with the first buffer and the second buffer, and may be configured to receive a elements from the first column of the first buffer including the first nonzero-valued element a selected to replace the first zero-valued element a and to receive b elements from locations in the second buffer that correspond to locations in the first buffer from where the a elements have been received by the first PE. In one embodiment, the first PE may be further configured to multiply the a elements received from the first column of the first buffer and the b elements received from the second buffer. In another embodiment, the control logic circuit may be further configured to indicate a b element at a location in the second buffer that corresponds to a location of the first nonzero-valued a element selected to replace the first zero-valued a element. In still another embodiment, the maximum borrowing distance of the first location may be a predetermined distance from the first location that is in at least one direction of at least one of three dimensions. In yet another embodiment, the control logic circuit may be further configured to select the first nonzero-valued a element to replace the first zero-valued a element based on the first nonzero-valued a element having a fewest number of possibilities of replacing a zero-valued a element as compared to a number of possibilities of other nonzero-valued elements that are within the maximum borrowing distance of the first location of the first zero-valued a element. In one embodiment, the second matrix B may be preprocessed to replace zero-valued elements of matrix B with nonzero-valued elements of second matrix B. In another embodiment, the control logic circuit may be further configured to pair nonzero-valued elements of the first matrix A with corresponding nonzero-valued elements of the second matrix B. In still another embodiment, the GEMM accelerator core may further include a third buffer and a second PE. The third buffer may include $K_0$ rows and $K_1$ columns of locations, and the third buffer configured to receive a elements of the first matrix A of activation values. The second PE may include an array of $K_0$ multipliers, and may be associated with the third buffer and the second buffer. The control logic circuit may be coupled to the third buffer, the control logic circuit may be configured to select a second nonzero-valued a element in the first buffer based a second zero-valued a element being in a first column of the third buffer and to replace the second zero-valued a element in the first column of the third buffer with the second nonzero-value a element in the first buffer in which the second nonzero-valued a element may be selected to replace the second zero-valued a element in the first column of the third buffer by being within a maximum borrowing distance of a second location of the second zero-valued a element in the first column of the third buffer. The second PE may be configured to receive a elements from the first column of the third buffer including the second nonzero-valued a element selected to replace the second zero-value a element and to receive b elements from locations in the second buffer that correspond to locations in the third and the first buffers from where the a elements have been received by the second PE. In one embodiment, the second PE may be further configured to multiply the a elements received from the first column of the third buffer and the b elements received from the second buffer. In another embodiment, the maximum borrowing distance of the second location in the first column of the third buffer may be a predetermined distance from the second location in the first column of the third buffer that is in at least one direction of at least one of three dimensions.

An example embodiment provides a general matrix-matrix accelerator core that may include a first buffer, a second buffer, a control logic circuit, and a first PE. The first buffer may include $K_0$ rows and $K_1$ columns of locations in which $K_0$ and $K_1$ are integers greater than 1, and the first buffer may be configured to receive elements a of a first matrix A of activation values. The second buffer may include $K_1$ rows and $K_0$ columns of locations, and may be configured to receive elements b of a second matrix B of weight values. The control logic circuit may be coupled to the first buffer, and may be configured to select a first nonzero-valued a element based a first zero-valued a element being in a first column of the first buffer in which the first nonzero-valued a element may be selected based on the first nonzero-valued a element having a fewest number of possibilities of replacing a zero-valued a element as compared to a number of possibilities of other nonzero-valued elements that are within a maximum borrowing distance of a first location of the first zero-valued a element in the first column of the first buffer. The first PE may include an array of $K_0$ multipliers, the first PE being associated with the first buffer and the second buffer, and the first PE being configured to receive a elements from the first column of the first buffer including the first nonzero-valued a element selected to replace the first zero-valued a element and to receive b elements from locations in the second buffer that correspond to locations in the first buffer from where the a elements have been received by the first PE. In one embodiment, the maximum borrowing distance of the first location may be a predetermined distance from the first location that is in at least one direction of at least one of three dimensions. In another embodiment, the second matrix B may be preprocessed to replace zero-valued elements of matrix B with nonzero-valued elements of second matrix B. In still another embodiment, the general matrix-matrix accelerator core may further include a third buffer and a second PE. The third buffer may include $K_0$ rows and $K_1$ columns of locations, and may be configured to receive elements a of a first matrix A of activation values. The second PE may include an array of $K_0$ multipliers, and may be associated with the third buffer and the second buffer. The control logic circuit may be coupled to the third buffer, and the control logic circuit may be further configured to select a second nonzero-valued a element in the first buffer based a second zero-valued a element being in a first column of the third buffer and to replace the second zero-valued a element in the first column of the third buffer with the second nonzero-value a element in the first buffer in which the second nonzero-valued a element may be selected from within the maximum borrowing distance of a second location of the second zero-valued a element. The second PE may be configured to receive a elements from the first column of the third buffer including the second nonzero-valued a element selected to replace the second zero-value a element in the first column of the third buffer and to receive b elements from locations in the second buffer that correspond to locations in the third and the first buffers from where the a elements have been received by the second PE.

An example embodiment provides a GEMM accelerator core that may include a first buffer, a second buffer, a third buffer, a control logic circuit, a first PE and a second PE. The first buffer may include $K_0$ rows and $K_1$ columns of locations in which $K_0$ and $K_1$ being integers greater than 1, and the first buffer may be configured to receive a elements of a first matrix A of activation values. The second buffer may include $K_1$ rows and $K_0$ columns of locations, and the second buffer may be configured to receive b elements of a second matrix B of weight values in which the second matrix B may be preprocessed to replace zero-valued elements of matrix B with nonzero-valued elements of second matrix B. The third buffer may include $K_0$ rows and $K_1$ columns of locations, and may be being configured to receive a elements of the first matrix A of activation values. The control logic circuit may be coupled to the first buffer and the third buffer, and may be configured to select a first nonzero-valued a element based a first zero-valued a element being in a first column of the first buffer and to replace the first zero-valued a element with the first nonzero-value a element in which the first nonzero-valued a element may be selected from within a maximum borrowing distance of a first location of the first zero-valued a element in the first column of the first buffer, and the control logic circuit may be further configured to select a second nonzero-valued a element in the first buffer based a second zero-valued a element being in a first column of the third buffer and to replace the second zero-valued a element with the second nonzero-value a element in which the second nonzero-valued a element may be selected from within a maximum borrowing distance of a second location of the second zero-valued a element. The first PE may include an array of $K_0$ multipliers array of multipliers, and may be associated with the first buffer and the second buffer. The first PE may be configured to receive a elements from the first column of the first buffer including the first nonzero-valued element a selected to replace the first zero-valued element a and to receive b elements from locations in the second buffer that correspond to locations in the first buffer from where the a elements have been received by the first PE. The second PE may include an array of $K_0$ multipliers array of multipliers, and may be associated with the third buffer and the second buffer. The second PE may be configured to receive a elements from the first column of the third buffer including the second nonzero-valued a element selected to replace the second zero-value a element and to receive b elements from locations in the second buffer that correspond to locations in the third and the first buffer from where the a elements have been received by the second PE. In one embodiment, the first PE may be further configured to multiply the a elements received from the first column of the first buffer and the b elements received from the second buffer, and the second PE may be further configured to multiply the a elements received from the first column of the third buffer and the b elements received from the second buffer. In another embodiment, the maximum borrowing distance of the first location may be a predetermined distance from the first location that is in at least one direction of at least one of three dimensions, and may be the predetermined distance from the second location that is in at least one direction of at least one of three dimensions. In still another embodiment, the second matrix B is preprocessed to replace zero-valued elements of matrix B with nonzero-valued elements of second matrix B. In yet another embodiment, the control logic circuit may be further configured to select the first nonzero-valued element a to replace the first zero-valued a element based on the first nonzero-valued a element having a fewest number of possibilities of replacing a zero-valued a element as compared to a number of possibilities of other nonzero-valued elements that are within the maximum borrowing distance of the first location of the first zero-valued a element. In one embodiment, the control logic circuit may be further configured to select the second nonzero-valued element a to replace the second zero-valued a element based on the second nonzero-valued a element having a fewest number of possibilities of replacing a zero-valued a element as compared to a number of possibilities of other nonzero-valued elements that are within the maximum borrowing distance of the second location of the second zero-valued a element.

BRIEF DESCRIPTION OF THE DRAWING

In the following section, the aspects of the subject matter disclosed herein will be described with reference to exemplary embodiments illustrated in the figures, in which:

FIGS. 5C-5G respective depict five snapshots of elements of an example data block being processed by a greedy preprocessing technique according to the subject matter disclosed herein.

DETAILED DESCRIPTION

Figure 1A:
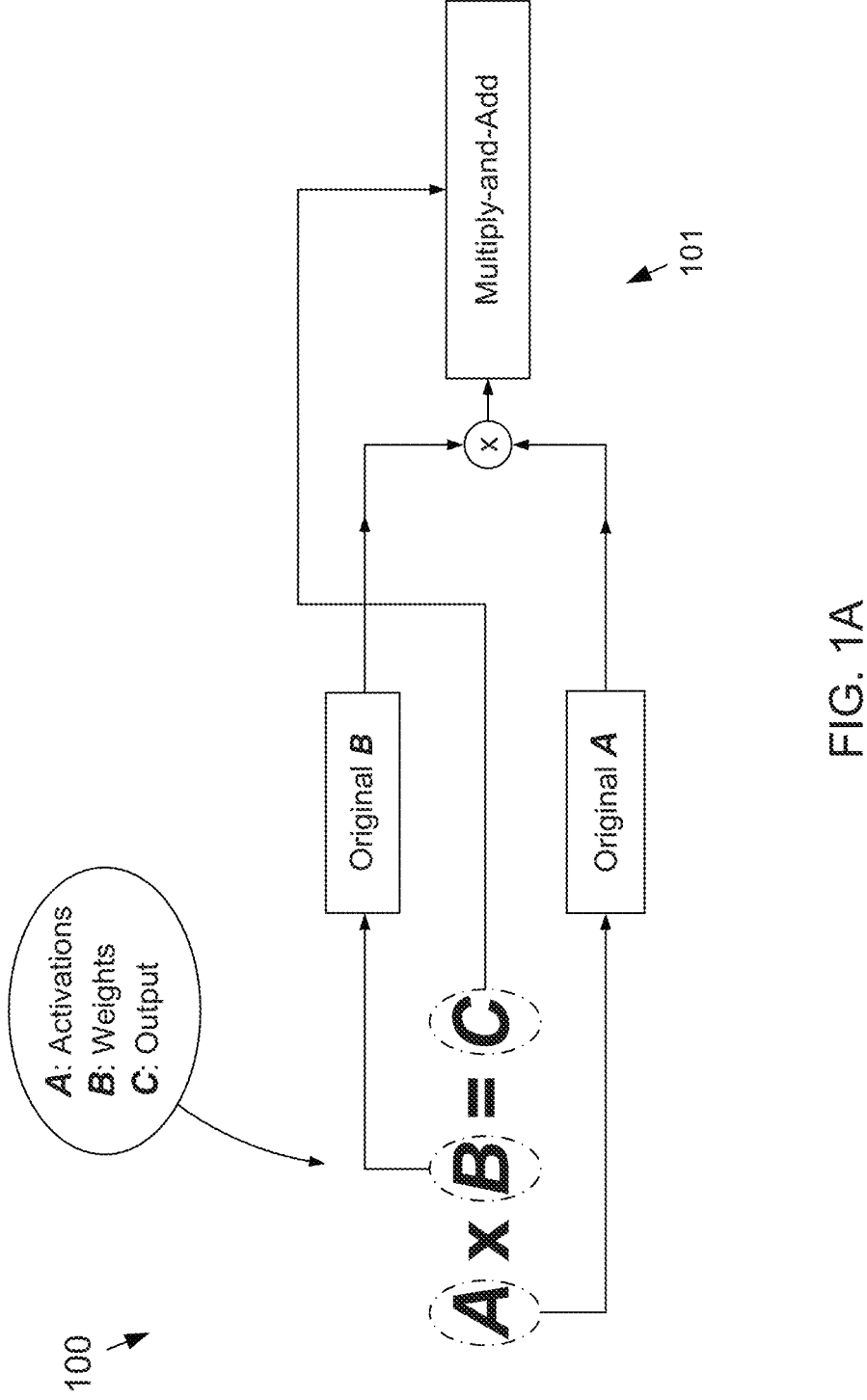
FIG. 1A is a block diagram depicting a high-level dataflow for a first example embodiment of an accelerator architecture configured for a dense/dense category data set according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides an accelerator architecture that may be optimized for all four sparsity-model categories with a goal to maximize power and area efficiency with a minimum overhead for the dense/dense sparsity-model category.

A general matrix-matrix multiplication (GEMM) accelerator core may be defined as a unit that computes C=A×B, and may be used as a main building block for DNNs. A GEMM accelerator may be implemented in hardware using two main optimizations: (1) a memory-hierarchy optimization that uses data blocking to minimize a size and data movement between different levels of the memory hierarchy, and (2) an optimization that unrolls nested loops in space to exploit parallelism and minimize energy per access.

For layers of a DNN (such as a convolution layer (CL) and a fully connected (FC) layer), an input tensor (activation values), parameters of a layer (weight values), and an output tensor may be respectively represented as $A_{M \times K}$, $B_{K \times N}$, and $C_{M \times N}$. In a FC layer, the kernel may be represented as a two-dimensional (2D) matrix $B_{K \times N}$, and the input activations as vectors of length K. A batch of input activations may, therefore, be represented as a 2D matrix $A_{M \times K}$ having M=Batch size that after multiplication by kernels results into a batch of outputs $C_{M \times N}$. In a convolution layer, a kernel is represented as a 2D matrix $B_{K \times N}$ with $K=C_{in} \times R \times S$ and $N=C_{out}$ in which $C_{in}$, R, S and $C_{out}$ are respectively the number of input channels, the filter height, the filter width and the number of output channels. Accordingly, an input feature map may be reshaped as a 2D matrix $A_{M \times K}$ with $M=H_{in} \times W_{in}$ and $K=C_{in} \times R \times S$ in which $H_{in}$ and $W_{in}$ are respectively the height and width of each input channel. For transformer-based models, GEMM operations appear in self-attention and feed-forward layers. A self-attention layer leverages GEMM operations to transform token vectors to key, query, and value vectors. A GEMM accelerator may also perform checking for similarity between all the generated query and key vectors.

FIG. 1A is a block diagram depicting a high-level dataflow for a first example embodiment of an accelerator architecture 100 configured for a dense/dense category data set according to the subject matter disclosed herein. As both matrices A and B are dense, the original data for matrix A and matrix B may be used directly to compute C at 101 without any sparse-data overhead processing. The functionality of the accelerator architecture 100 may be provided by one or more modules.

Figure 1B:
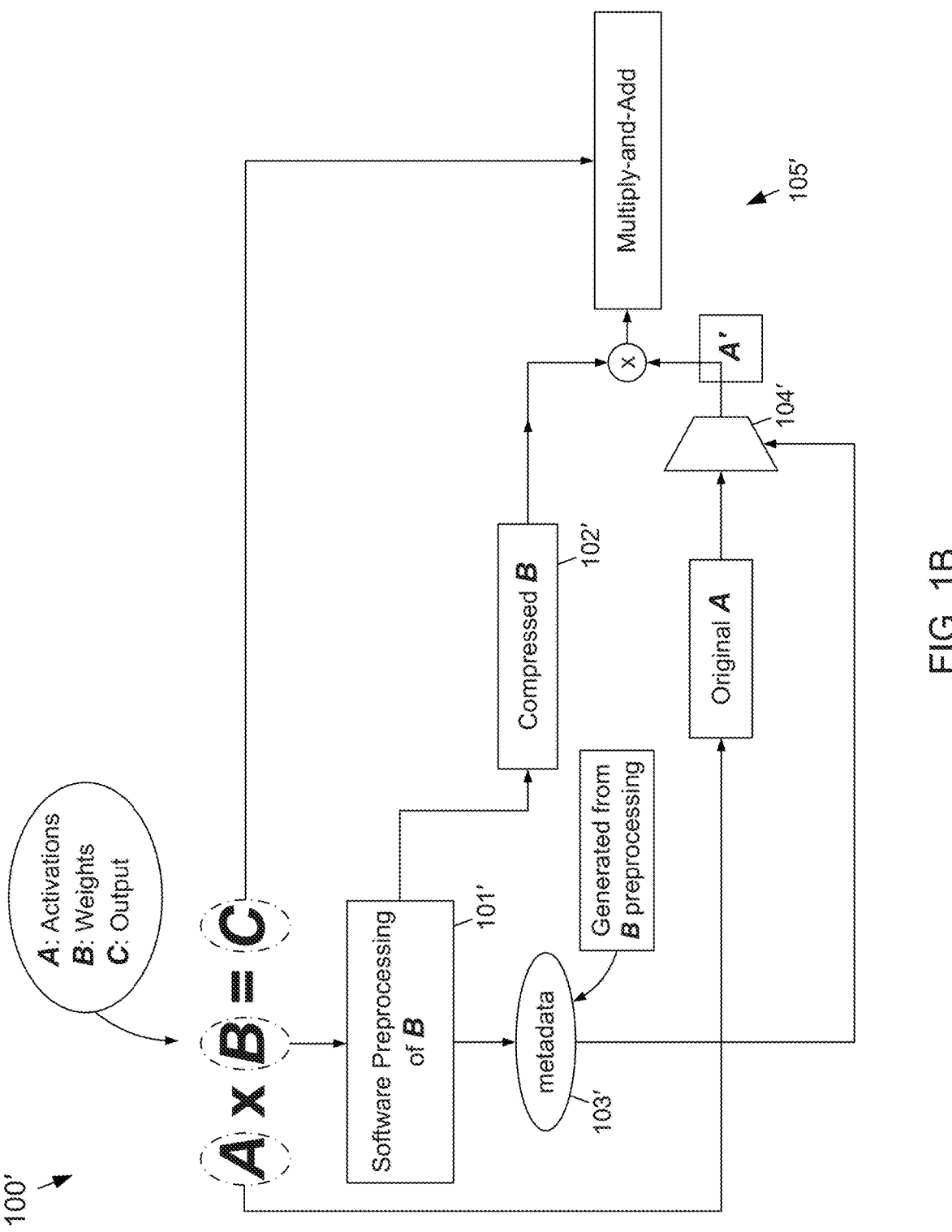
FIG. 1B is a block diagram depicting a high-level dataflow for a second example embodiment of an accelerator architecture configured for a dense/sparse category data set according to the subject matter disclosed herein.

FIG. 1B is a block diagram depicting a high-level dataflow for a second example embodiment of an accelerator architecture 100' configured for a dense/sparse category data set according to the subject matter disclosed herein. Matrix B is preprocessed at 101' to form compressed matrix B at 102'. In one embodiment, a greedy-type preprocessing may be used, which is described below. Although the preprocessing is indicated in FIG. 1B to be software preprocessing, it should be understood that hardware preprocessing may alternatively be used. That is, the functionality of the accelerator architecture 100' may be provided by one or more modules. The preprocessing at 101' also generates metadata 103' that provides information about how matrix B was compressed, that is, information about the locations of zero-valued elements b of matrix B that have been replaced by nonzero-value elements b and the original locations of the nonzero-values that replace the zero-valued elements. The metadata 103' is used to control a multiplexing switch 104' to appropriately select elements a of the matrix A to form a matrix A' having elements a' in locations that correspond to elements b of the compressed matrix B. The matrix A' and the compressed matrix B are then used to compute C at 105'.

Figure 1C:
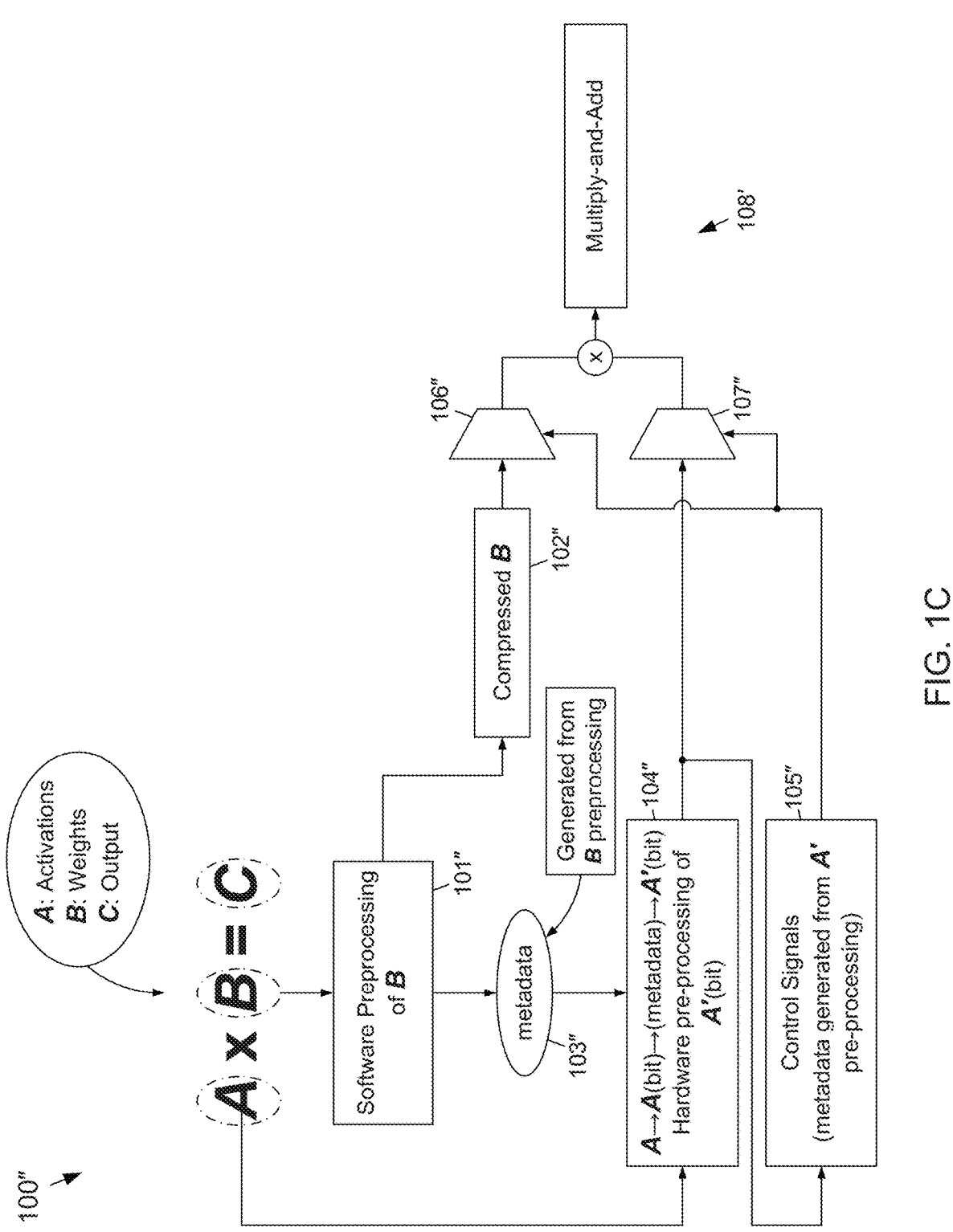
FIG. 1C is a block diagram depicting a high-level dataflow for a third example embodiment of an accelerator architecture configured for a sparse/sparse category data set according to the subject matter disclosed herein.

FIG. 1C is a block diagram depicting a high-level dataflow for a third example embodiment of an accelerator architecture 100" configured for a sparse/sparse category data set according to the subject matter disclosed herein. Matrix B is preprocessed at 101" to form compressed matrix B at 102". Again, a greedy-type preprocessing may be used. Additionally, hardware preprocessing may alternatively be used instead of software preprocessing. Metadata 103" is generated by the preprocessing that provides information about how matrix B was compressed, that is, information about the locations of zero-valued elements b of matrix B that have been replaced by nonzero-value elements b and the original locations of the nonzero-values that replace the zero-valued elements. At 104", a bit-mask matrix A(bit) that reflects locations of zero-value and nonzero-value elements in matrix A. The bit-mask matrix A(bit) is then modified by the metadata 103" to form a preprocessed bit-mask matrix A'(bit).

Figure 1D:
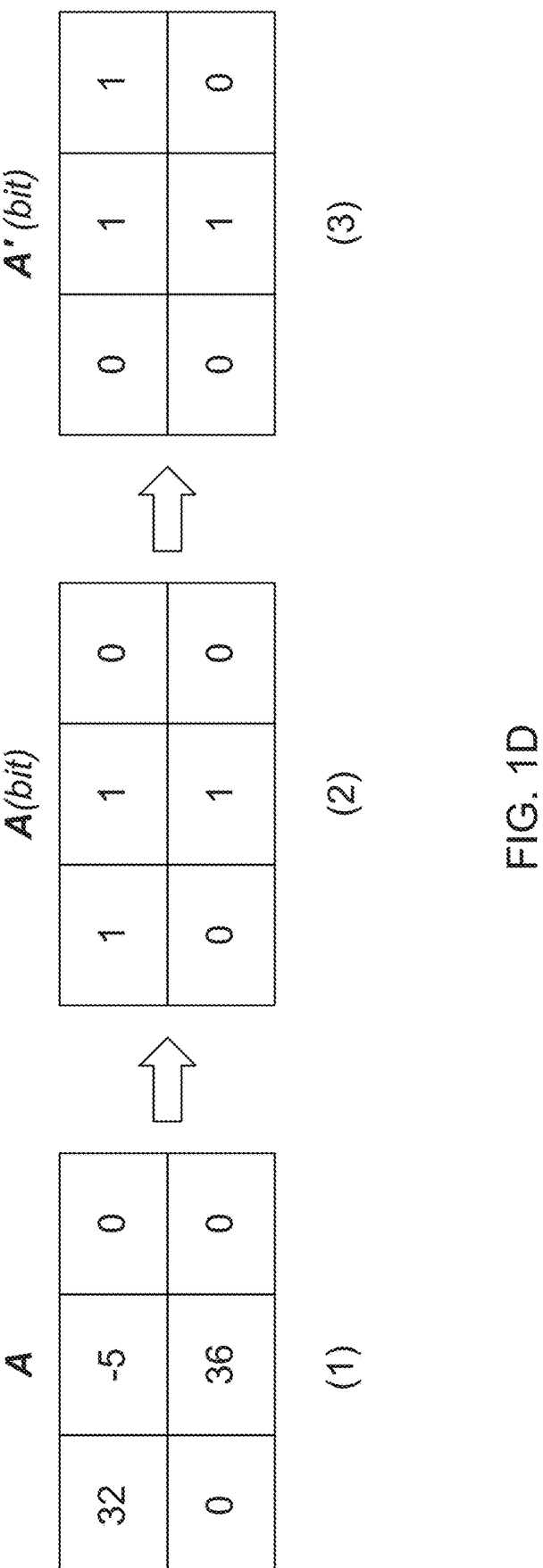
FIG. 1D shows an example of forming a preprocessed bit-mask matrix A'(bit) from a matrix A.

FIG. 1D shows an example of forming a preprocessed bit-mask matrix A'(bit) from a matrix A. An example matrix A is shown at (1) in FIG. 1D. At (2), a bit-mask matrix A(bit) is formed with a "1" at each nonzero-value location and a "0" at each zero-value location in matrix A. At (3) the bit-mask matrix A(bit) is processed by metadata 103 (not shown) to form a preprocessed bit-mask matrix A'(bit).

Returning to FIG. 1C, control signals are generated at 105" from the preprocessed bit-mask matrix A'(bit) that are used to control multiplexing switches 106" and 107", which respectively select elements of the compressed matrix B and matrix A to compute C at 108".

Figure 2A:
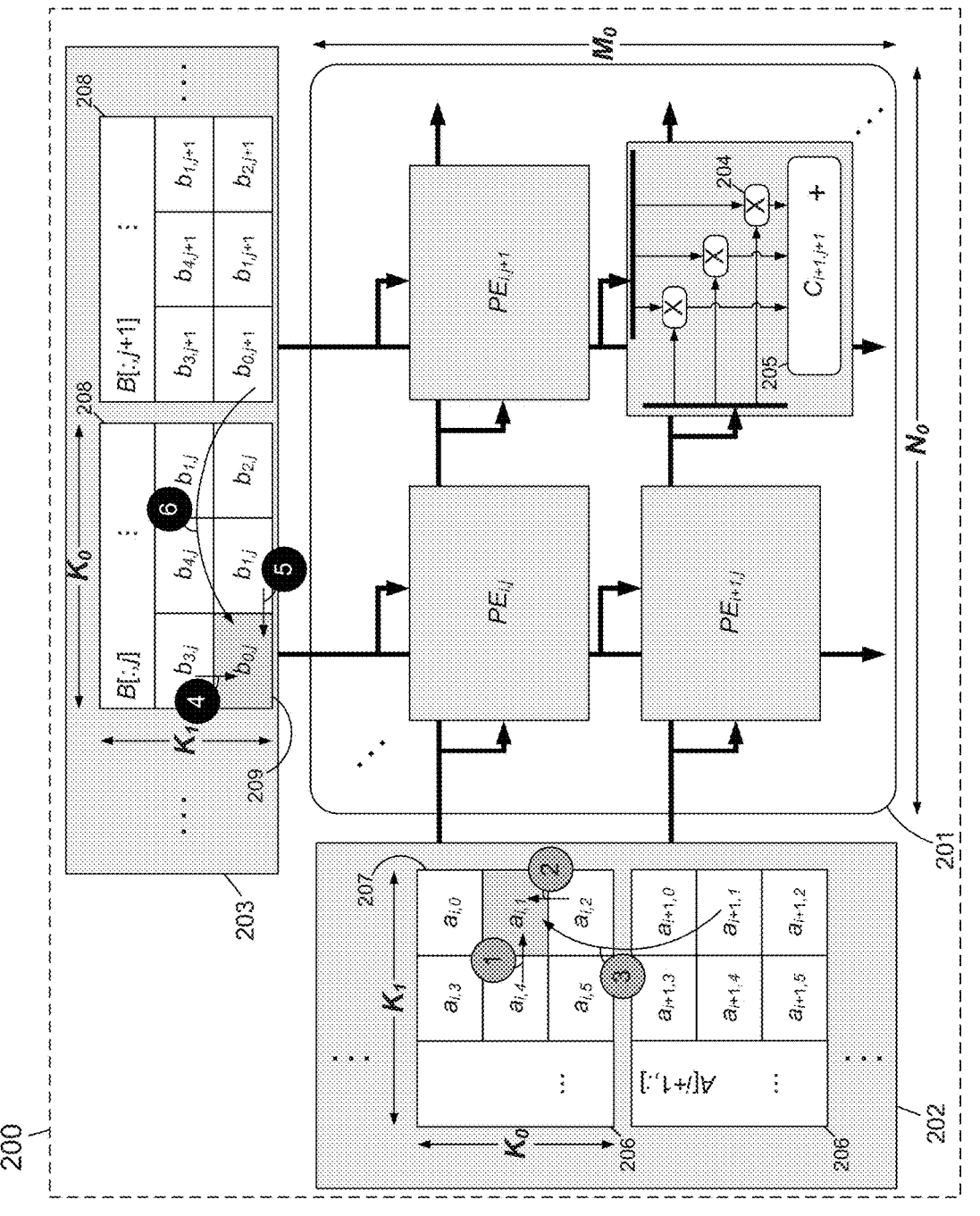
FIG. 2A depicts a block diagram of a portion of an example embodiment of a GEMM accelerator core according to the subject matter disclosed herein.

FIG. 2A depicts a block diagram of a portion of an example embodiment of a GEMM accelerator core 200 according to the subject matter disclosed herein. The portion of the GEMM accelerator core 200 depicted is configured for a dense/dense datapath arrangement according to the subject matter disclosed herein.

The GEMM accelerator core 200 may include an array 201 of processing elements (PEs), an activation broadcast unit (ABU) 202 and a weight broadcast unit (WBU) 203. The PEs of the array 201 may be arranged in $M_0$ rows and $N_0$ columns. Each PE may include $K_0$ multipliers 204 (of which only one multiplier 204 is indicated), and an accumulator (adder tree) 205 connected as shown. For the example embodiment depicted in FIG. 2A, $K_0$ is equal to 3. It should be understood, however, that $K_0$ may be any integer greater than 2. $M_0$, $N_0$ and $K_1$ may each be any integers greater than 1.

The ABU 202 may include $M_0$ activation distribution units (ADUs) 206 arranged in $M_0$ rows and one column. Each ADU 206 may include $K_0$ rows and $K_1$ columns of activation registers 207, of which only one activation register is indicated. The activation buffer registers 207 may be configured as RAM, such as static random-access memory (SRAM) or dynamic random-access memory (DRAM). In one embodiment, the activation buffer registers 207 may be indexed by location so that all activation buffer registers in the ADU 206 in the first row have a first index i that indicates which row of ADUs the activation buffer register is located, and a second index that indicates a particular location in the $K_0$ rows and $K_1$ columns of the ADU. For example, the activation buffer register $a_{i,0}$ is located at the upper right corner of the ADU 206 in the first (or top) row of ADUs. That is, the activation register $a_{i,0}$ is located at the top row and the rightmost column of the first row of ADUs 206. The activation buffer register $a_{i,3}$ is located at the top row and the second from the rightmost column of the first row of ADUs 206. The activation buffer register $a_{i+1,1}$ is located at the middle row and the rightmost column of the second row of ADUs 206.

The WBU 203 may include $N_0$ weight distribution units (WDUs) 208 arranged in one row and $N_0$ columns. Each WDU 208 may include $K_1$ rows and $K_0$ columns of weight buffer registers 209. The weight buffer registers 209 may be configured as a random-access memory, such as SRAM or DRAM. Locations of the weight buffer registers 209 may be indexed so that all weight buffer registers in the WDU 208 in the first column have a first index that indicates a particular location in the $K_1$ rows and $K_0$ columns of the WDU, and a second index j that indicates which column of WDUs the weight buffer register is located. For example, the weight buffer register $b_{0,j}$ is located at the lower left corner of the WDU 208 in the first (or leftmost) column of WDUs.

That is, the activation buffer register $b_{0,j}$ is located at the bottommost row and the leftmost column of the first column of WDUs 208. The weight buffer register $b_{3,j}$ is located at the second row from the bottommost row and the leftmost column of the first column of WDUs 208. The weight buffer register $b_{0,j+1}$ is located at the bottommost row and the leftmost column of the second column of WDUs 208.

A three-dimensional (3D) realization of the GEMM accelerator 200 involves both matrix A and B to be rearranged/blocked in three dimensions. That is, each respective row and column of matrices A and B may be stored in a 2D manner in, for example, a SRAM bank.

The pseudo-code below provides blocking of C=A×B with the $A_{M×K}$, $B_{K×N}$ and $C_{MN}$ matrices. Alternatively, blocking may be provided by hardware. The first two loops of the pseudo-code (Lines 1-2) tile the codes so that the activation and weight data fits on the GEMM accelerator core. The GEMM accelerator core 200 realizes the inner loops (lines 3-8) and unrolls the operation in three dimensions ($M_0$, $N_0$, $K_0$). The GEMM accelerator core 200 is configured so that matrices A and B are reshaped to be 3D tensors, and the maximum distances from which a non-zero element may be borrowed across each of the three dimensions of the input tensors are respectively represented as $da_1$, $da_1$, $da_3$ for A, and $db_1$, $db_2$, $db_3$ for B.

```
1:    for i in [0:M] // step=M0, ceil(M/M0)=M1
2:      for+ in [0,N] // step=N0, ceil(N/N0)=N1
3:        for k in [0:K] // step=K0, , ceil(K/K0)=K1, dimensions da₁, db₁
4:          // for _all means unrolling in space
5:          for_all ii in [0,M0] // step=1, dimensions da₃
6:            for_all jj in [0:N0] // step=1, dimension db₃
7:              for_all kk in [0:K0] // step=1, dimension da₂, db₂
8:                c[M0 × ii + i, N0 × j + jj] += a[M0 × i + ii, K0 × k +
                  kk] × b[K0 × k + kk, N0 × jj + j]
```

Each element a in A is adjacent to other elements a in three dimensions. For example, element $a_{i,1}$ is adjacent to element $a_{i,4}$ in a $d_1$ direction (or dimension). Element $a_{i,1}$ is adjacent to element $a_{i,2}$ in a $d_2$ direction, and is adjacent to element $a_{i+1,1}$ in a $d_3$ direction. Each element b in B is similarly adjacent to other elements b in three dimensions. For example, element $b_{0,j}$ is adjacent to element $b_{3,1}$ in a $d_1$ direction, adjacent to element $b_{1,j}$ in a $d_2$ direction, and adjacent to element $b_{0,j+1}$ in a $d_3$ direction. The adjacency of a elements in the three dimensions allows a "proximity element" to be "borrowed" from a maximum distance of $da_1$, $da_1$ and $da_3$ across all neighboring dimensions in matrix A. The distances $da_1$, $da_1$ and $da_3$ are respectively indicated at 1, 2 and 3 in FIG. 2A. The adjacency of b elements in the three dimensions allows a "proximity element" to be "borrowed" from a maximum distance of $db_1$, $db_2$ and $db_3$ across all neighboring dimensions in matrix B. The distances $db_1$, $db_2$ and $db_3$ are respectively indicated at 4, 5 and 6 in FIG. 2A. The example maximum distance for each of $da_1$, $da_1$ and $da_3$ and each of $db_1$, $db_2$ and $db_3$ is one element, but it should be understood that any or all of the maximum distances may be greater than one element.

When both matrices A and B are dense, no proximity-element borrowing (i.e., operand borrowing) is performed by the GEMM accelerator 200 because all elements of A and B are nonzero value elements and all multiplication operations are effectual operations. The multipliers 204 share operand fetch logic (not shown) and execute operations concurrently. Thus, when both matrices A and B are dense, the control overhead to operate the GEMM accelerator 200 may be considered to be a baseline overhead. While a dense/dense GEMM accelerator minimizes control over-head, a dense datapath is unable to skip an ineffectual operation when either or both of matrices A and B are sparse.

To accommodate sparse activation and/or weight data, additional logic is used to find zero operands, either by preprocessing or by an on-the-fly detection, so that ineffec-tual operations (zero operations) may be skipped. According to the subject matter disclosed herein, the skipped operations may be replaced with nonzero operations from future cycles of the same multiplier or from adjacent multipliers. As used herein, the term "adjacent multipliers" are multipliers hav-ing operands that are proximity elements (i.e., elements that are proximate to each other) that are within a maximum borrowing distance of $da_1$, $da_1$ and $da_3$ across all neighbor-ing dimensions in matrix A and within a maximum borrow-ing distance of $db_1$, $db_2$ and $db_3$ across all neighboring dimensions in matrix B.

Generally, detecting zero operations and replacing zero operations with nonzero operations adds extra overhead to the control overhead for a dense/dense datapath core. The extra overhead for a sparse datapath may be based on borrowing-distance dimensions of two proximity elements when only one of matrix A or matrix B are sparse. When matrix B is known before execution and matrix B may be preprocessed before being written into the B RAM. The preprocessing may replace zero-value elements with non-zero-value elements from neighboring elements, thereby forming a compressed form of matrix B. The preprocessing may also generate metadata that describes how nonzero-value elements have replaced zero-value elements.

Figure 2B:
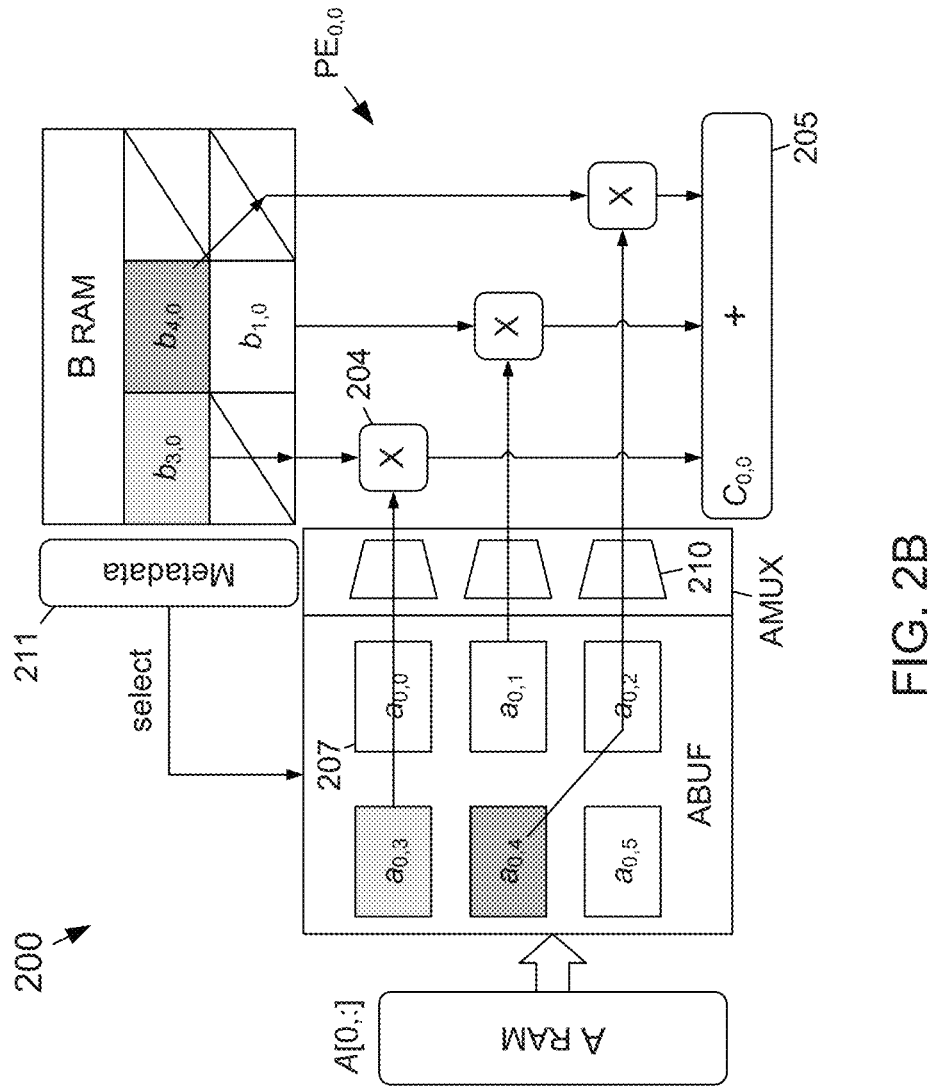
FIG. 2B depicts a block diagram of another portion of the example embodiment of the GEMM accelerator core configured for a dense/sparse datapath arrangement according to the subject matter disclosed herein.

FIG. 2B depicts a block diagram of another portion of the example embodiment of the GEMM accelerator core 200 configured for a dense/sparse datapath arrangement accord-ing to the subject matter disclosed herein. A high-level data flow for the GEMM accelerator core 200 corresponds to the high-level data flow depicted for the second example embodiment of the accelerator architecture 100' of FIG. 1B configured for a dense/sparse category data set. The portion of the example embodiment of the GEMM accelerator core 200 depicted supports sparsity in matrix B using prepro-cessing of matrix B that replaces a zero-value element b with a nonzero-value element that is located within or equal to the maximum borrowing distances of $db_1$, $db_2$ and $db_3$ across all neighboring dimensions in matrix B.

A single $PE_{0,0}$ is shown in FIG. 2B to depict a first example operation of the GEMM accelerator core 200 when matrix A is dense and matrix B is sparse. The $PE_{0,0}$ is shown as including three multipliers 204, of which only one mul-tiplier 204 is indicated. It should be understood that the $PE_{0,0}$ (and other PEs of the GEMM accelerator core 200) may include any integer number of multipliers 204 greater than 1. Elements of the (dense) matrix A are transferred from an A RAM to registers 207 in an A buffer (ABUF), of which only one register 207 is indicated. A group (AMUX) of multiplexers 210 are positioned between the ABUF and the multipliers 204. Inputs to the multiplexers 210 of the AMUX are coupled to registers 207 in ABUF. Only one multiplexer 210 is indicated. The connections between the input to a multiplexer 210 and the registers 207 are a function of maximum borrowing distances $da_1$, $da_1$ and $da_3$, which are respectively based on the maximum borrowing distances $db_1$, $db_2$ and $db_3$, and are not shown. The outputs of the multiplexers 210 are coupled to the multipliers 204.

Matrix B is sparse, so the elements of the matrix B have been preprocessed to identify zero-value elements using a greedy preprocessing technique (described below), and are then stored in a B RAM in a manner that may be considered to be dense.

For a first operational example of the GEMM accelerator core 200 in FIG. 2B, the maximum borrowing distances for each of the three dimensions $da_1$, $da_1$ and $da_3$ and for each of the three dimensions $db_1$, $db_2$ and $db_3$ is 1, i.e., (1,1,1). Additionally for this operational example, preprocessing has determined that the b elements at locations $b_{0,0}$ and $b_{2,0}$ in the B RAM prior to preprocessing are zero-value elements, as indicated by a diagonal line in the $b_{0,0}$ and $b_{2,0}$ locations. Accordingly, the zero-value elements at locations $b_{0,0}$ and $b_{2,0}$ are respectively replaced by nonzero-value elements from locations $b_{3,0}$ and $b_{4,0}$. Preprocessing also generates metadata 211 that may be used to select the a elements that correspond to the replacement b elements so that the mul-tipliers 204, for a first computational cycle, do not perform ineffective operations. For this example, the a elements at locations $a_{0,3}$ and $a_{0,4}$ in the A RAM are selected based on the metadata 211.

The (3D) borrowing distances between the element pair ($b_{0,0}$, $b_{3,0}$) and between the element pair ($b_{2,0}$, $b_{4,0}$) are respectively $(db_1,db_2,db_3)=(1,0,0)$ and $(db_1,db_2,db_3)=(1,1,0)$. If a b element in a current computational cycle is nonzero, no replacement is needed. For both of the b replacement elements, the multiplexers 210 of the AMUX select the appropriate a elements based on the metadata 211 that was generated by preprocessing the matrix B. In this example, the a elements at locations $a_{0,3}$ and $a_{0,4}$ are respec-tively selected as the corresponding multiplicative operands for the b replacement elements $b_{3,0}$ and $b_{4,0}$. Outputs from the multipliers 104 are input to an accumulator (adder tree) 205.

Figure 2C:
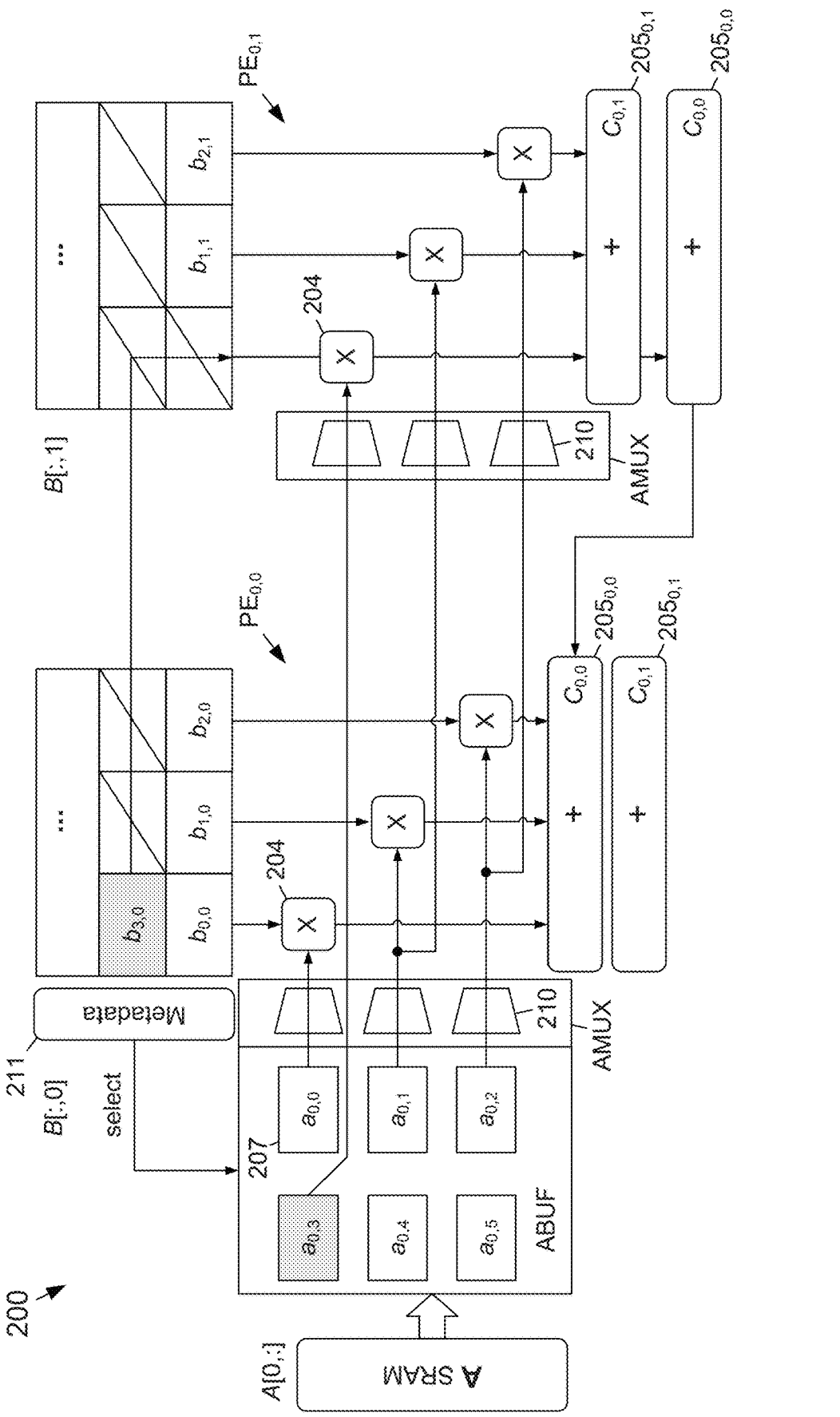
FIG. 2C depicts a block diagram of still another portion of the example embodiment the GEMM accelerator core configured for a dense/sparse datapath arrangement according to the subject matter disclosed herein.

FIG. 2C depicts a block diagram of still another portion of the example embodiment the GEMM accelerator core 200 configured for a dense/sparse datapath arrangement accord-ing to the subject matter disclosed herein. As previously mentioned, the high-level data flow for the GEMM accel-erator core 200 corresponds to the high-level data flow depicted for the second example embodiment of the accel-erator architecture 100' configured for a dense/sparse cat-egory data set.

Two PEs in an example row of PEs are shown to depict a second operational example of the GEMM accelerator core 200 when matrix A is dense and matrix B is sparse. The maximum borrowing distances for each of the three dimen-sions $da_1$, $da_1$ and $da_3$ and for each of the three dimensions $db_1$, $db_2$ and $db_3$ are again (1,1,1). The b elements at locations $b_{0,0}$, $b_{1,0}$ and $b_{2,0}$ in the B RAM for this operational example prior to preprocessing are nonzero values, while the b element at location $b_{0,1}$ is a zero-value element. Accord-ingly, preprocessing replaces the zero-value element at loca-tion $b_{0,1}$ with the nonzero-value element at location $b_{3,0}$. The borrowing distance is $(db_1,db_2,db_3)=(1,0,1)$. Inputs to the multiplexers 210 in the AMUX for $PE_{0,1}$ are also coupled to the outputs of the multiplexers 210 in the AMUX for $PE_{0,0}$ so the a element at $a_{0,3}$ is input to the multiplier 204 where the nonzero b element from $b_{3,0}$ has been relocated. The replacement of the zero-value element by a nonzero-value element results in a computation being performed in a neighboring PE (i.e., $PE_{0,1}$). An additional accumulator 2052 is used so that a partial result may be directed back to the accumulator in $PE_{0,0}$.

In contrast to the matrix B in FIGS. 2B and 2C, which has elements that are generally known (i.e., weights), the matrix A is generally not dense and is generally not preprocessed before execution, so on-the-fly zero-operand detection may be performed on a sparse matrix A to replace zero-operands with nonzero operands. In one embodiment, on-the-fly zero-operand detection may be based on the greedy preprocessing technique described below.

Figure 2D:
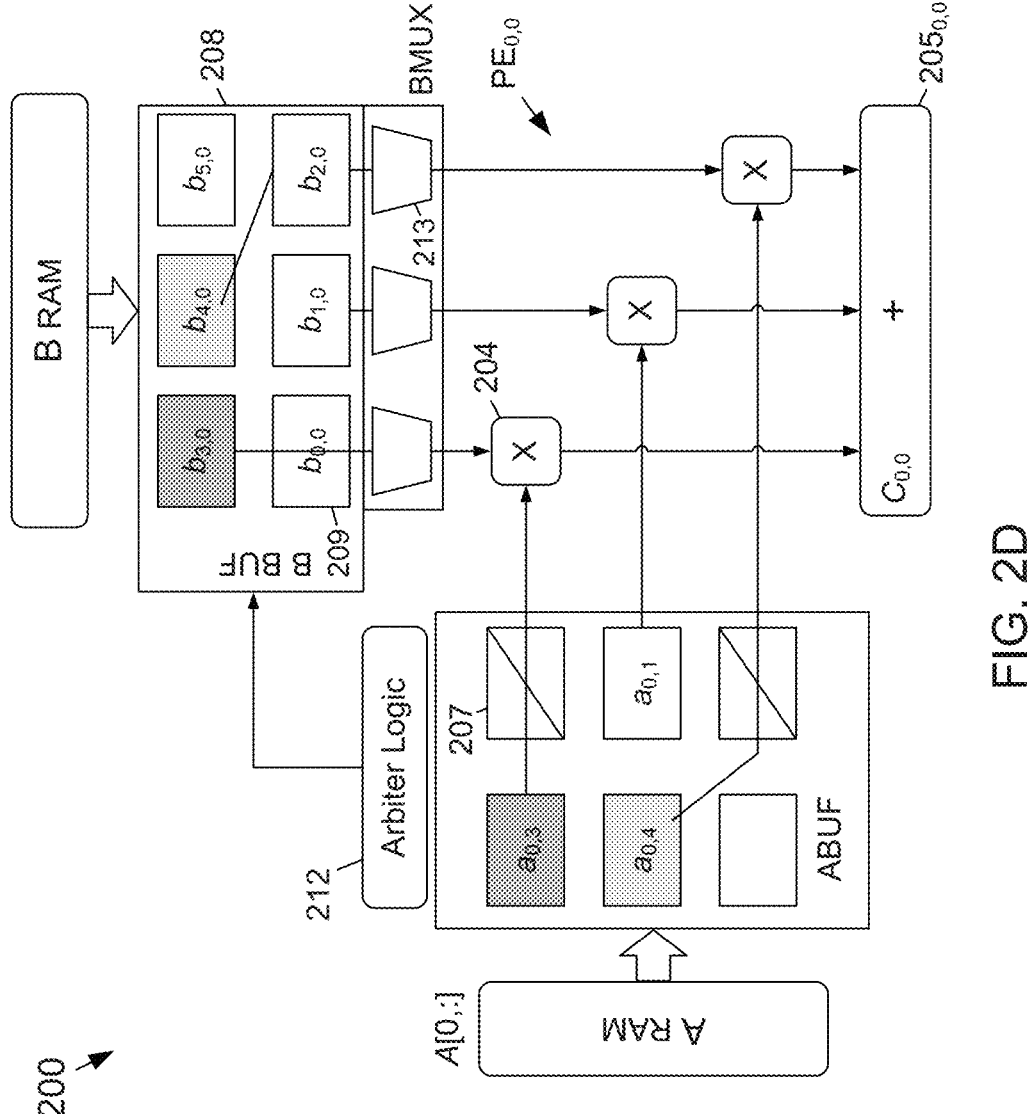
FIG. 2D depicts a block diagram of yet another portion of the example embodiment the GEMM accelerator core configured for a sparse/dense datapath arrangement according to the subject matter disclosed herein.

FIG. 2D depicts a block diagram of yet another portion of the example embodiment the GEMM accelerator core 200 configured for a sparse/dense datapath arrangement according to the subject matter disclosed herein. That is, the portion of the example embodiment of the GEMM accelerator core 200 depicted is an architecture that supports sparsity in matrix A using on-the-fly zero-operand detection of matrix A that replaces a zero-value element a with a nonzero-value element that is located within or equal to the maximum borrowing distances of $da_1$, $da_1$ and $da_3$ across all neighboring dimensions in matrix A. Accordingly, a high-level data flow for the GEMM accelerator core 200 corresponds to the high-level data flow depicted for the third example embodiment of the accelerator architecture 100 of FIG. 1C configured for a sparse/sparse category data set.

A single $PE_{0,0}$ is depicted in FIG. 2D to illustrate a third operational example of the GEMM accelerator core 200 when matrix A is sparse and matrix B is dense (or was sparse and preprocessed to be dense). The $PE_{0,0}$ is shown as including three multipliers 204, of which only one multiplier 204 is indicated. It should be understood that the $PE_{0,0}$ (and other PEs of the GEMM accelerator core 200) may include any integer number of multipliers 204 greater than 1.

The operational example in FIG. 2D depicts two locations where zero-value operands $a_{0,0}$ and $a_{0,2}$ are respectively replaced with nonzero operands $a_{0,3}$ and $a_{0,4}$. The maximum borrowing distances between the pair $(a_{0,0}, a_{0,3})$ and between the pair $(a_{0,2}, a_{0,4})$ are respectively $(da_1, da_1, da_3)=(1,0,0)$ and $(da_1, da_1, da_3)=(1,1,0)$. If an element in a current computational cycle is nonzero, no replacement is needed. In the present example, an arbiter logic 212 is used to detect and replace zero-value operands. During any cycle, the arbiter logic 212 evaluates a window-worth of elements of matrix A that are fetched from A RAM and currently reside in the ABUF. The elements of matrix B corresponding to elements of matrix A in ABUF are also fetched and held in a buffer BBUF. The arbiter logic 212 selects nonzero b operands in ABUF and generates the indices to select appropriate values from BBUF. These indices are input into a group BMUX of multiplexers 213. It should be noted that ABUF also uses MUXs, but are not shown in FIG. 2D. The MUXs for the ABUF may be shared between all PEs in a row, while each PE uses a standalone BMUX.

Figure 2E:
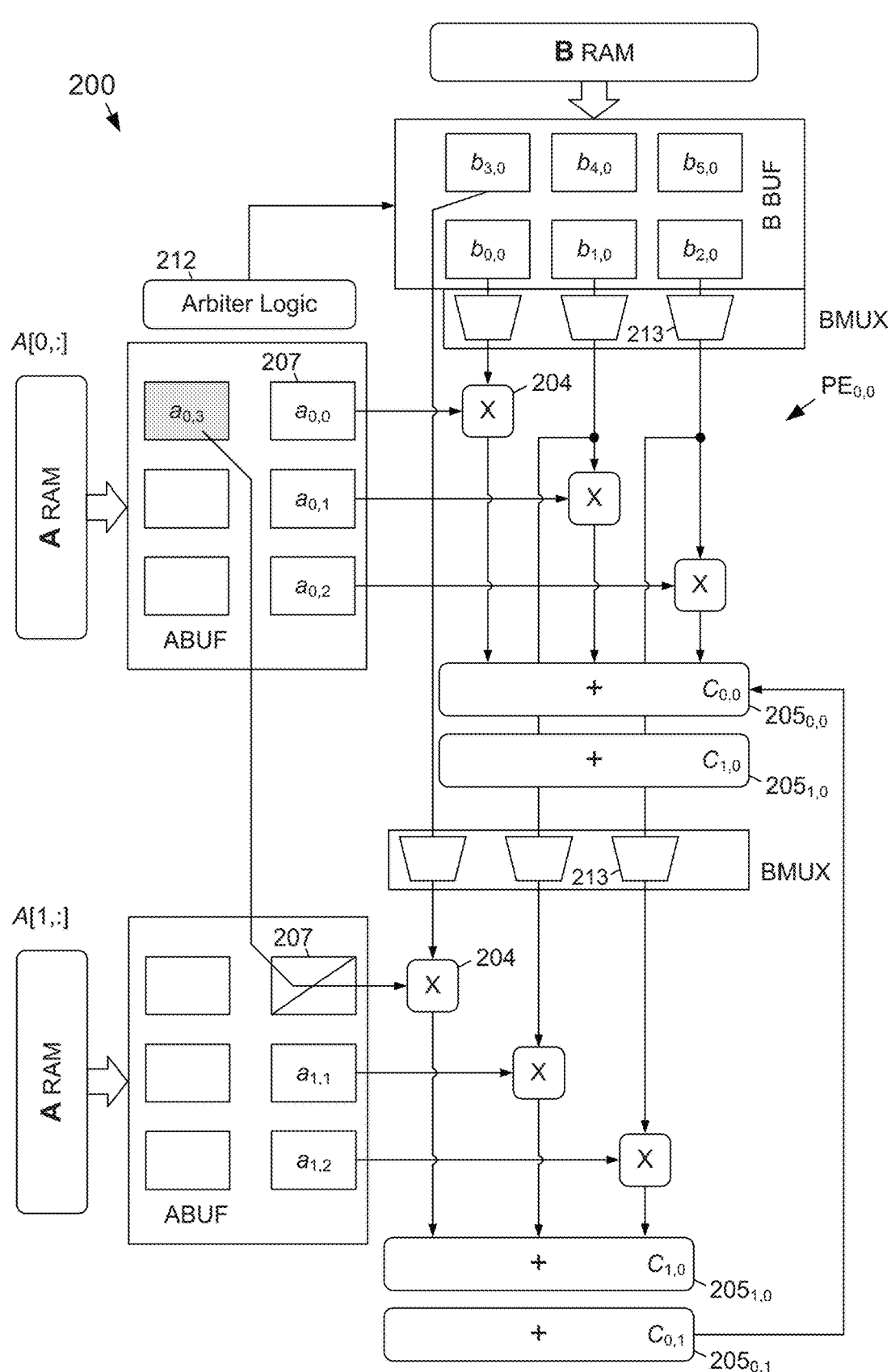
FIG. 2E depicts a block diagram of another portion of the example embodiment the GEMM accelerator core configured for a sparse/dense datapath arrangement according to the subject matter disclosed herein.

FIG. 2E depicts a block diagram of another portion of the example embodiment the GEMM accelerator core 200 configured for a sparse/dense datapath arrangement according to the subject matter disclosed herein. As previously mentioned, the high-level data flow for the GEMM accelerator core 200 corresponds to the high-level data flow depicted for the third example embodiment of the accelerator architecture 100" of FIG. 1C.

Two PEs in an example column of PEs are shown to illustrate a fourth operational example of the GEMM accelerator core 200 when matrix A is sparse and matrix B is dense (or was sparse and preprocessed to be dense). For this operational example, a zero-value element at location $a_{1,0}$ is replaced with a nonzero-value element from location $a_{0,3}$ (borrowing distance is $(da_1, da_1, da_3)=(1,0,1)$). An additional adder tree 205$_{0,1}$ is used so that a partial-sum value may be directed to the correct accumulator (accumulator in $PE_{0,0}$) because the multiplication is performed an the adjacent $PE_{1,0}$ having a different accumulator.

In the accelerator architectures 100' and 100", there are respectively $da_1 \times da_1 \times da_3$ and $db_1 \times db_2 \times db_3$ potential non-zero candidates for replacing a zero operand in A and B. The depth of ABUF and BBUF, the fan-in of AMUX and BMUX, and the number of adder trees depend on the limits of distance for replacement elements in the different dimensions.

For unstructured sparse input matrices A and B, zero-value elements (operands) may not necessarily be uniformly or evenly distributed. This aspect may still exists after preprocessing B or on-the-fly zero skipping on A. A coarse-grain load balancing may be used to distribute nonzero values and improve performance utilization. With a coarse-grain load-balancing approach, a GEMM operation may be decomposed into smaller blocks and each block may be assigned to an available (i.e., idle) PE. Alternatively, a fine-grain approach may be used that shuffles the input matrices A and B along their second dimension (i.e., $da_2$ and $db_2$) in the GEMM core. The shuffling may occur, over the dense matrices A and B, before preprocessing is applied (matrix B) or input to the buffer for on-the-fly zero skipping (matrix A). While there are many ways to perform shuffling, it may be observed that simple permutation is sufficient. Thus, if an element is located in $(i_1, i_2, i_3)$ in an input matrix, the element will be relocated to $(i_1, i_2 \bmod K_0, i_3 i3)$ in which $K_0$ is the number of multipliers in each PE (FIG. 2A). Note that shuffling may occur on both matrices A and B. To relocate the elements of A to corresponding elements of B, rotation-based shuffling involves a $K_0 \times K_0$ crossbar between RAM and the ABUFs. Therefore, shuffling may be limited to local rotations between four consecutive elements (in $da_1$ and $db_2$) to reduce the $K_0 \times K_0$ crossbar to multiple $(K_0/4)$ 4×4 crossbars. This localization may not impact load balancing.

The various portion of the GEMM accelerator core 200 depicted in FIGS. 2A-2E may be optimized for all four sparsity-model categories. That is, the GEMM accelerator core 200 is an architecture that support sparsity in both matrices A and B. A zero-value element $(a_1, a_2, a_3)$ in matrix A is replaced with a nonzero element $(a_1+\Delta_1, a_2+\Delta_2, a_3+\Delta_3)$ in which the borrowing distances $\Delta_i \le da_i$ and $da_i$ is the maximum borrowing distance for A in dimension i. Similarly, a zero-value element $(b_1, b_2, b_3)$ in matrix B is replaced with a nonzero-value element $(b_1+\Delta'_1, b_2+\Delta'_2, b_3+\Delta'_3)$ in which the borrowing distances $\alpha'_i \le db_i$ and $db_i$ is the maximum borrowing distance for B in dimension i. Accordingly, the GEMM accelerator core 200 supports dual sparsity by replacing zero-value elements in the six dimensions of matrices A and B.

Figure 3:
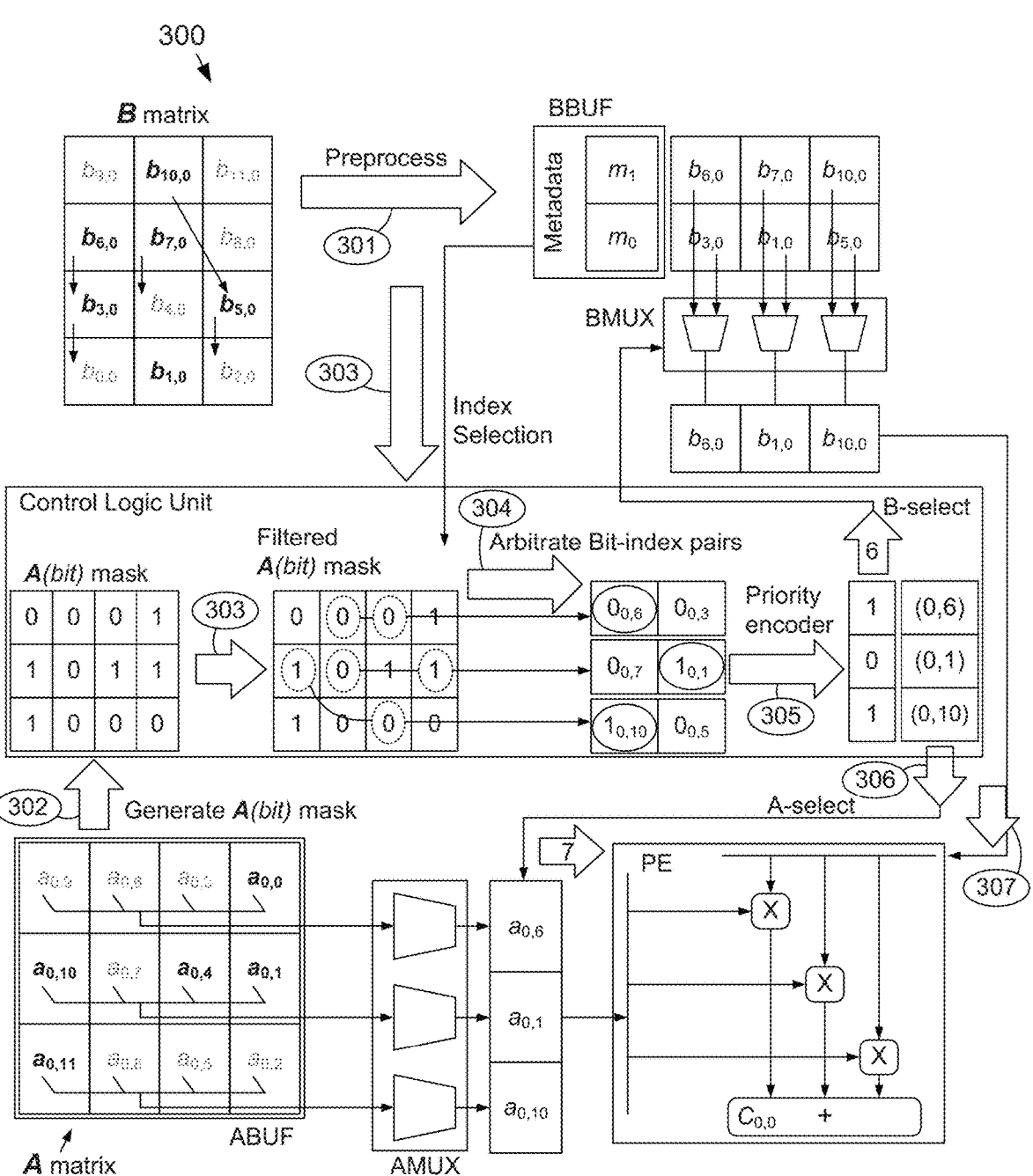
FIG. 3 depicts an example embodiment of a processing sequence for the GEMM accelerator core of FIGS. 2A-2E to support all four sparsity-model categories according to the subject matter disclosed herein.

FIG. 3 depicts an example embodiment of a processing sequence 300 for the GEMM accelerator core 200 to support all four sparsity-model categories according to the subject matter disclosed herein.

The matrix B is known before execution so B is prepro-cessed at 301 by a greedy algorithm at compile time to form a compressed format that is stored in RAM because B is known before execution. Metadata is also generated that includes information of weight routing by the preprocessing. The preprocessed elements of B in RAM are fetched and placed in the BBUF, which holds a window of current elements every cycle. In the example depicted in FIG. 3, nonzero-value elements $b_{1,0}$, $b_{3,0}$, $b_{5,0}$, $b_{6,0}$, $b_{7,0}$ and $b_{10,0}$ are placed in the BBUF, and are ready to be selected for processing by a PE that is configured to compute an inner product.

The elements of A that correspond to the elements of B currently in the BBUF are placed in the ABUF. At 302, a zero-checking circuit in a control logic circuit processes the elements of the matrix A in the ABUF to form an A(bit) mask that indicates whether the a element is a zero-value or a nonzero-value element. The elements $a_{0,0}$, $a_{0,1}$, $a_{0,4}$, $a_{0,10}$ and $a_{0,11}$ are the elements of A having mask bits that equal 1.

At 303, the metadata in the BBUF is used to zero bits in the A(bit) mask for instances of a corresponding weight being zero for form a filtered A(bit) mask, which corresponds to the preprocessed bit-mask matrix A'(bit) in FIG. 1D. In the example of FIG. 3, $a_{0,0}$, $a_{0,4}$ and $a_{0,11}$ become zero.

At 304, the 1 s remaining in the filtered A(bit) mask are arbitrated (associated) with nonzero-value b elements (operands) in operations to create bit-indexed pairs.

At 305, the selected bit-index pairs are selected by a priority encoder that indicates which activation-weight pair is the first non-zero pair. In the example of FIG. 3, $(a_{0,6}, b_{6,0})$, $(a_{0,1}, b_{1,0})$, and $(a_{0,10}, b_{10,0})$ are selected. If there is no bit-indexed pair, a default value zero is selected.

At 306 (two places), using the control signals (indices) generated by the priority encoder, two vectors of operands are selected from ABUF and BBUF.

At 307, the selected operands are input to the PE for execution.

The overhead used to realize the processing sequence 300 of FIG. 3 includes a control logic circuit per PE that detects nonzero operands as the pairs of A and B for each PE are generally different. When the maximum borrowing distance for both A and B matrices $(da_1, da_1, da_3, db_1, db_2, db_3)$ is fixed to a set of integer parameters (x, y, z, x', y', z'), the ABUF is shared within a row of PEs, and the depth of the ABUF is $L=(1+x)\times(1+x')$. The BBUF is shared within a column of PEs, and the depth of the BBUF is $(1+x')$. Each PE uses its own AMUX and BMUX (see FIG. 3). The fan-ins for AMUX and BMUX are respectively $1+(L-1)\times(1+y+y')\times(1+z)$ and $1+x\times(1+y)$. Lastly, dual sparsity support uses $z\times z'$ extra adders per PE.

Figure 4A:
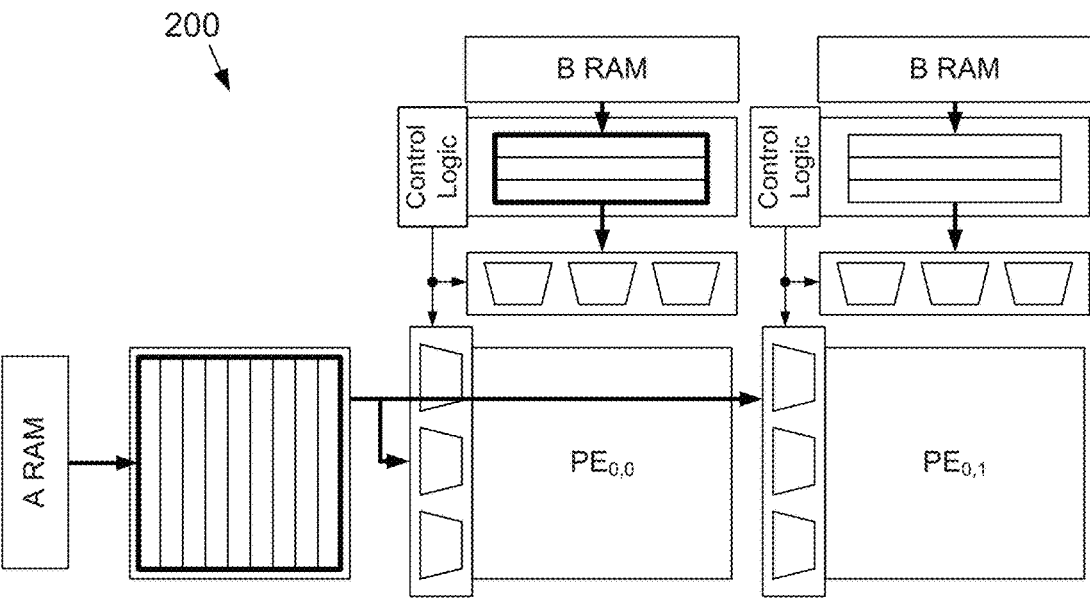
FIG. 4A-4C respectively depict three example embodiments of a GEMM accelerator core that adapt to the different four sparsity-model categories according to the subject matter disclosed herein.
Figure 4B:
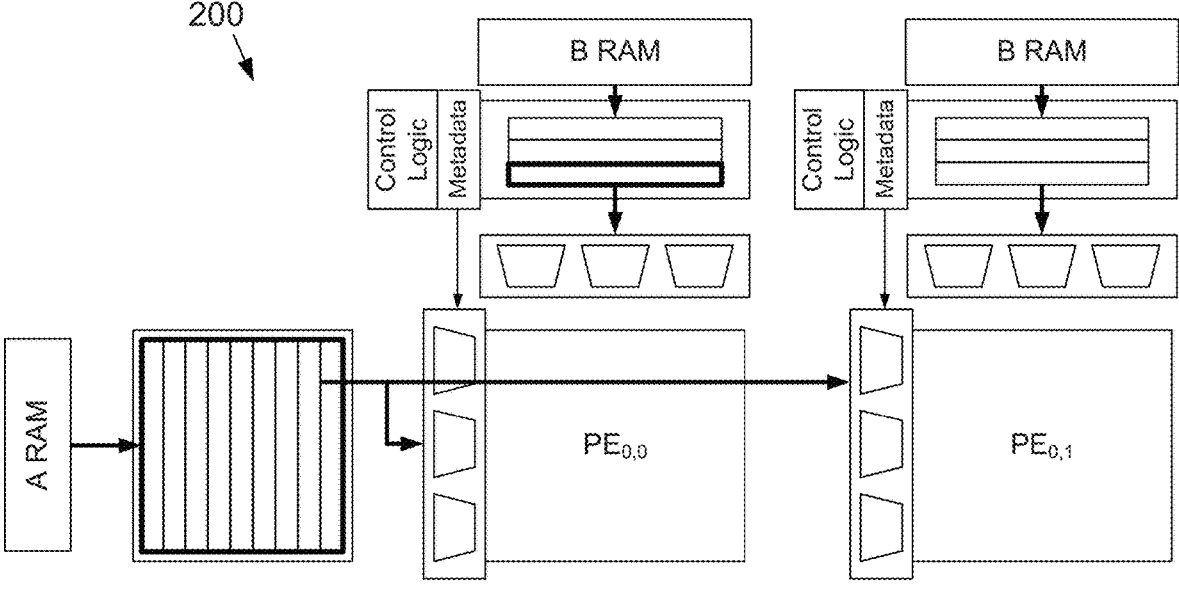
Figure 4C:
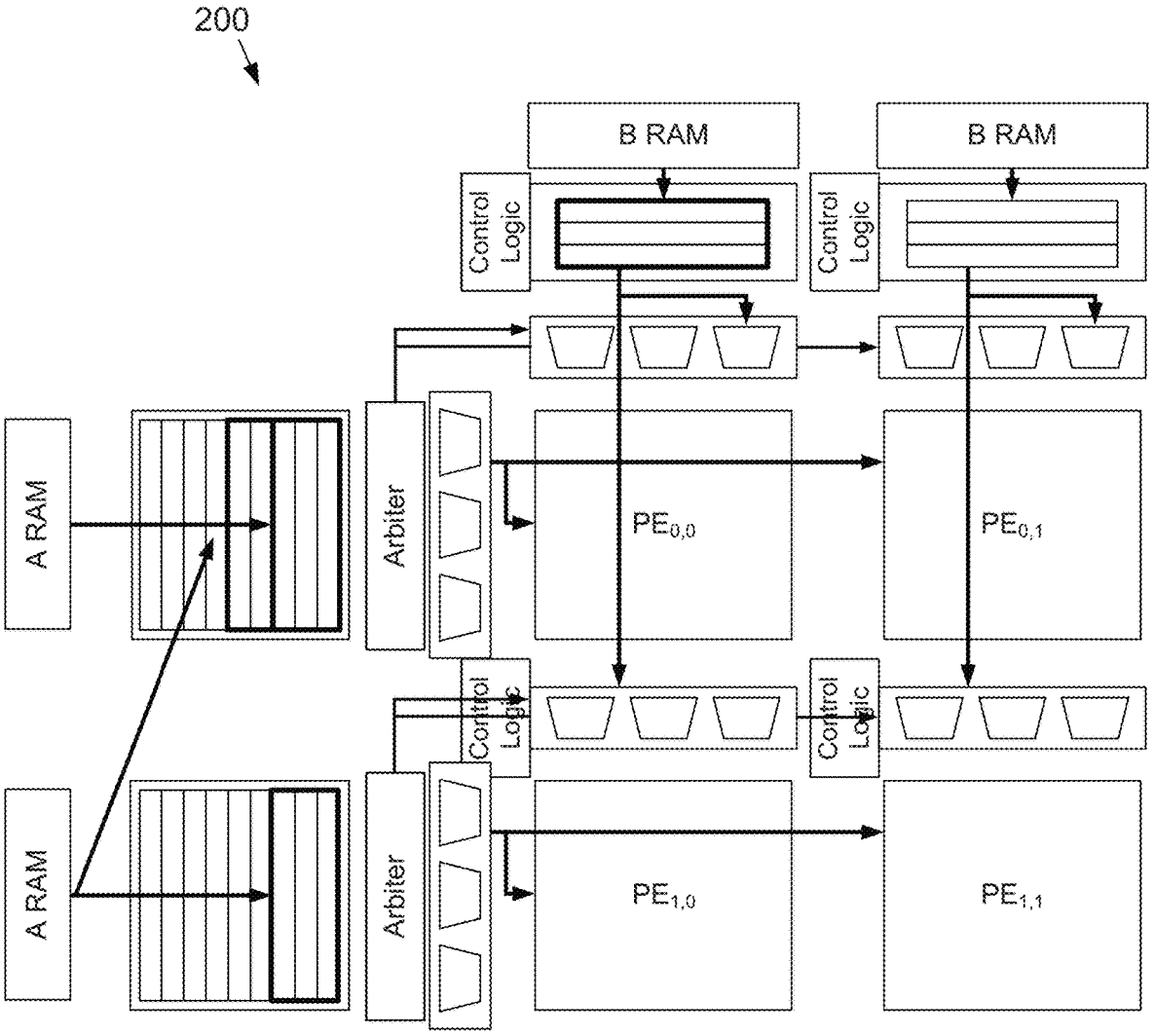

FIG. 4A-4C respectively depict three example embodiments of a GEMM accelerator core 200 that adapt to the different four sparsity-model categories according to the subject matter disclosed herein. In one embodiment, the GEMM accelerator core 200 automatically adapts to the different sparsity-model categories based on information determined by a compiler prior to operating the GEMM accelerator core 200. The GEMM accelerator core 200 may also be configured to reuse the dual sparsity (sparse/sparse) overheads to operate in the single sparse cases (i.e., dense/sparse and sparse dense data models).

When a sparse/sparse data model is being run, FIG. 4A depicts the example embodiment of the GEMM accelerator core 200 adapted to the sparse/sparse data model by being configured for maximum borrowing distances $(da_1, da_1, da_3, db_1, db_2, db_3)=(2,0,0,2,0,1)$. Other maximum borrowing distances for a sparse/sparse data model are possible. The example configuration depicted in FIG. 4A uses a nine-element ABUF, a three-element BBUF, a nine-input AMUX, three-input BMUX, and one extra adder tree (not shown in FIG. 4A).

When a dense/sparse data model is being run, FIG. 4B depicts the example embodiment of the GEMM accelerator core 200 adapts to the dense/sparse data model by being configured for maximum borrowing distances $(db_1, db_2, db_3)=(8,0,1)$. Other maximum borrowing distances for a dense/sparse data model are possible. The example configuration depicted in FIG. 4B uses the entire nine elements of the ABUF and uses 4 bits of metadata per element of B rather than 3 bits. As matrix A is dense, the control logic circuit in each PE may be idle and the metadata values are sufficient for generating indices for the AMUXs. Additionally, only one entry of the BBUF is used; consequently, BMUX indices are fixed to 0.

When a sparse/dense data model is being run, FIG. 4C depicts the example embodiment of the GEMM accelerator core 200 adapts to the sparse/dense data model by being configured for maximum borrowing distances $(da_1, da_1, da_3)=(2,1,1)$. Other maximum borrowing distances for a sparse/dense data model are possible. The example configuration depicted in FIG. 4C uses the entire three elements of the BBUF. Additionally, the extra adder tree associated with each PE is also reused because this example configuration allows borrowing from $da_3$. There are, however, three main changes from the sparse/sparse data model configuration (FIG. 4A). First, the sparse/dense data model configuration uses three entries of the ABUF from the current row and two from a neighboring ABUF. As an ABUF has nine spaces from nine entries, the element from the neighboring ABUF is also copied into the current ABUF. Second, the process of zero skipping and arbitration may become more complicated because borrowing from the $da_1$ direction is permitted. Just one arbiter is, however, used per row of PE because only A is sparse, and the control logic circuit in each PE is bypassed. Third, due to enabling borrowing from the $da_1$ direction, the fan-in of the BMUXs increases from three to five.

When a dense/dense data model is being run, the example embodiment of the GEMM accelerator core 200 adapts to be is configured as depicted in FIG. 2A.

Figure 5A:
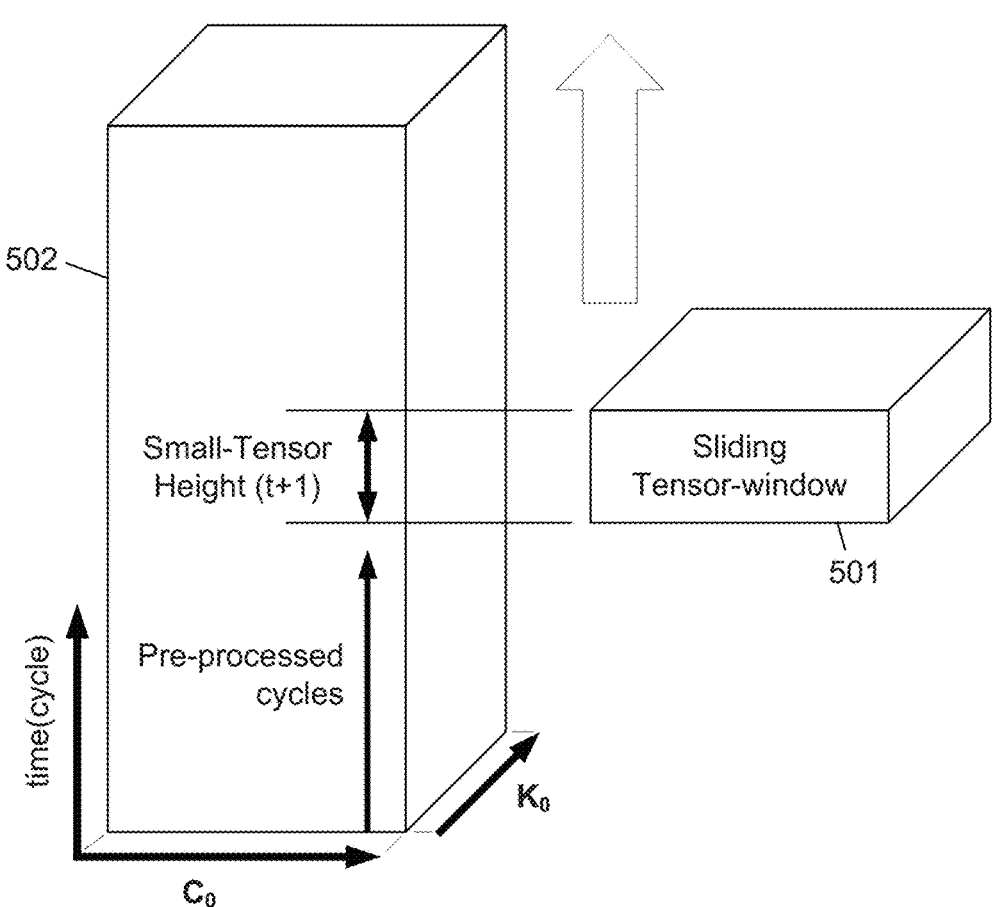
FIGS. 5A and 5B depict aspects of an example embodiment of a greedy preprocessing technique according to the subject matter disclosed herein.
Figure 5B:
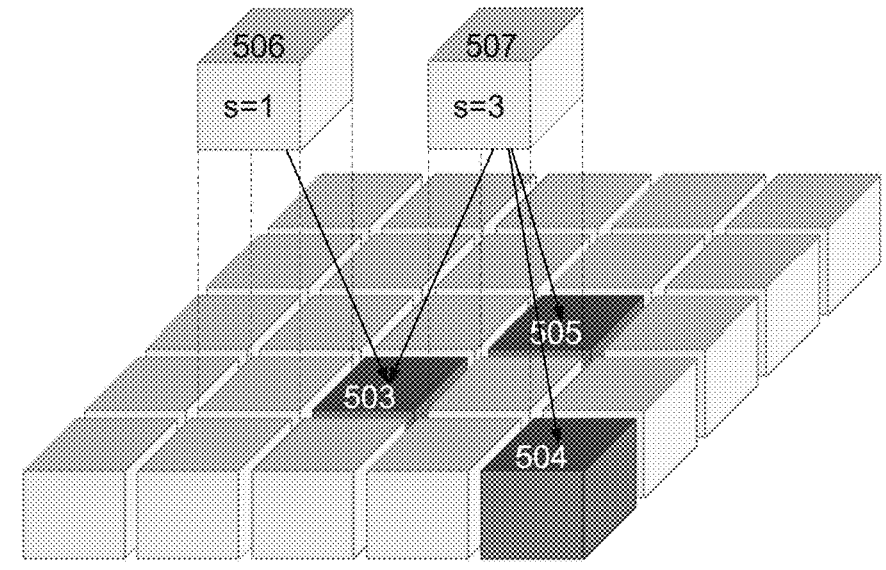

FIGS. 5A and 5B depict aspects of an example embodiment of a greedy preprocessing technique according to the subject matter disclosed herein. In FIG. 5A, a sliding tensor window 501 is used to preprocess a data block 502, which may be data from a B or an A matrix. The following description will focus on a data block 502 that is from a B matrix. Preprocessing of a matrix A will be similar.

The data block 502 may have dimensions of $C_0 \times K_0 \times$ cycles, in which $C_0$ is the number of multipliers in a PE, $K_0$ is the number of PEs, and cycles is the depth of the data block 502. For this example, the maximum borrowing distances are $(db_1, db_2, db_3)=(1,1,1)$. With a maximum borrowing distance in the $db_1$ direction being 1, the sliding tensor window 501 has a height of t+1, in which t in this example embodiment is one cycle. Thus, the example slight tensor window 501 has a height of 2t. In another embodiment, the maximum borrowing distance $db_1$ may be greater than 1.

Initially, the sliding tensor window 501 is placed to overlap the first 2t cycles of the data block 502, and locations of zero-valued elements in the first cycle t are determined. FIG. 5B depicts an example in which three zero-valued elements 503-505 are located in the first cycle t, and are indicated by relatively darker cubes. Two nonzero-valued elements 506 and 507 are depicted in cycle t+1, and are candidate elements for replacing the zero-valued elements in cycle t.

The greedy preprocessing technique determines which nonzero-valued candidate element is selected to replace a zero-valued element by determining a score based on the number of potential locations that a candidate element may move without exceeding the maximum borrowing distances $(db_1, db_2, db_3)$. The candidate element having a lowest score is selected to replace a zero-value element. If one or more candidate elements have equally low scores, then selection of one of the candidate elements having the low score may be based on a further criterion.

Candidate element 506 can potentially move to only zero-valued element 503 without exceeding the borrowing distances, so the score for element 506 is s=1. Candidate element 507 can potentially move to any of the three zero-valued elements 503-505, so the score for element 507 is s=3. Accordingly, candidate element 506 replaces the zero-valued element 503, and candidate element 507 may be used to replace either zero-valued element 504 or 506. Preprocessing continues by moving the sliding tensor window 501 to the next cycle (as indicated by the upward arrow in FIG. 5A) and replacing zero-valued elements in the next cycle with nonzero-valued elements without exceeding the borrowing distances.

FIGS. 5C-5G respective depict five snapshots of elements of an example data block 502 being processed by a greedy preprocessing technique having an exemplary maximum borrowing distance of $(db_1, db_2, db_3)=(3, 1, 1)$ for weights according to the subject matter disclosed herein. In FIG. 5C, the data block 502 is in an initial state (i.e., prior to preprocessing). As processing proceeds through FIGS. 5D-5G, zero-valued elements are replaced by nonzero-valued elements from a later cycle. At FIG. 5G, preprocessing is complete.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A general matrix-matrix (GEMM) accelerator core, comprising:
   a first buffer comprising $K_0$ rows and $K_1$ columns of locations, the first buffer being configured to receive a elements of a first matrix A of activation values, and $K_0$ and $K_1$ being integers greater than 1;
   a second buffer comprising $K_1$ rows and $K_0$ columns of locations, the second buffer being configured to receive b elements of a second matrix B of weight values;
   a control logic circuit coupled to the first buffer, the control logic circuit being configured to select a first nonzero-valued a element based a first zero-valued a element being in a first column of the first buffer and to replace the first zero-valued a element with the first nonzero-value a element, the first nonzero-valued a element being selected to replace the first zero-valued a element in the first column of the first buffer being within a maximum borrowing distance of a first location of the first zero-valued a element in the first column of the first buffer; and
   a first processing element (PE) comprising an array of $K_0$ multipliers, the first PE being associated with the first buffer and the second buffer, and being configured to receive a elements from the first column of the first buffer including the first nonzero-valued element a selected to replace the first zero-valued element a and to receive b elements from locations in the second buffer that correspond to locations in the first buffer from where the a elements have been received by the first PE.

2. The GEMM accelerator core of claim 1, wherein the first PE is further configured to multiply the a elements received from the first column of the first buffer and the b elements received from the second buffer.

3. The GEMM accelerator core of claim 1, wherein the control logic circuit is further configured to indicate a b element at a location in the second buffer that corresponds to a location of the first nonzero-valued a element selected to replace the first zero-valued a element.

4. The GEMM accelerator core of claim 1, wherein the maximum borrowing distance of the first location comprises a predetermined distance from the first location that is in at least one direction of at least one of three dimensions.

5. The GEMM accelerator core of claim 1, wherein the control logic circuit is further configured to select the first nonzero-valued a element to replace the first zero-valued a element based on the first nonzero-valued a element having a fewest number of possibilities of replacing a zero-valued a element as compared to a number of possibilities of other nonzero-valued elements that are within the maximum borrowing distance of the first location of the first zero-valued a element.

6. The GEMM accelerator core of claim 1, wherein the second matrix B is preprocessed to replace zero-valued elements of matrix B with nonzero-valued elements of second matrix B.

7. The GEMM accelerator core of claim 6, wherein the control logic circuit is further configured to pair nonzero-valued elements of the first matrix A with corresponding nonzero-valued elements of the second matrix B.

8. The GEMM accelerator core of claim 1, further comprising:

a third buffer comprising $K_0$ rows and $K_1$ columns of locations, the third buffer configured to receive a elements of the first matrix A of activation values; and a second PE comprising an array of $K_0$ multipliers, the second PE being associated with the third buffer and the second buffer, wherein the control logic circuit is coupled to the third buffer, the control logic circuit being configured to select a second nonzero-valued a element in the first buffer based a second zero-valued a element being in a first column of the third buffer and to replace the second zero-valued a element in the first column of the third buffer with the second nonzero-value a element in the first buffer, the second nonzero-valued a element being selected to replace the second zero-valued a element in the first column of the third buffer being within a maximum borrowing distance of a second location of the second zero-valued a element in the first column of the third buffer, and wherein the second PE is configured to receive a elements from the first column of the third buffer including the second nonzero-valued a element selected to replace the second zero-value a element and to receive b elements from locations in the second buffer that correspond to locations in the third and the first buffers from where the a elements have been received by the second PE.

9. The GEMM accelerator core of claim 8, wherein the second PE is further configured to multiply the a elements received from the first column of the third buffer and the b elements received from the second buffer.

10. The GEMM accelerator core of claim 8, wherein the maximum borrowing distance of the second location in the first column of the third buffer comprises a predetermined distance from the second location in the first column of the third buffer that is in at least one direction of at least one of three dimensions.

11. A general matrix-matrix (GEMM) accelerator core, comprising:

a first buffer comprising $K_0$ rows and $K_1$ columns of locations, the first buffer being configured to receive elements a of a first matrix A of activation values, and $K_0$ and $K_1$ being integers greater than 1;

a second buffer comprising $K_1$ rows and $K_0$ columns of locations, the second buffer being configured to receive elements b of a second matrix B of weight values;

a control logic circuit coupled to the first buffer, the control logic circuit being configured to select a first nonzero-valued a element based a first zero-valued a element being in a first column of the first buffer, the first nonzero-valued a element being selected based on the first nonzero-valued a element having a fewest number of possibilities of replacing a zero-valued a element as compared to a number of possibilities of other nonzero-valued elements that are within a maximum borrowing distance of a first location of the first zero-valued a element in the first column of the first buffer; and a first processing element (PE) comprising an array of $K_0$ multipliers, the first PE being associated with the first buffer and the second buffer, and the first PE being configured to receive a elements from the first column of the first buffer including the first nonzero-valued a element selected to replace the first zero-valued a element and to receive b elements from locations in the second buffer that correspond to locations in the first buffer from where the a elements have been received by the first PE.

12. The GEMM accelerator core of claim 11, wherein the maximum borrowing distance of the first location comprises a predetermined distance from the first location that is in at least one direction of at least one of three dimensions.

13. The GEMM accelerator core of claim 12, wherein the second matrix B is preprocessed to replace zero-valued elements of matrix B with nonzero-valued elements of second matrix B.

14. The GEMM accelerator core of claim 13, further comprising:

a third buffer comprising $K_0$ rows and $K_1$ columns of locations, the third buffer being configured to receive elements a of a first matrix A of activation values; and a second PE comprising an array of $K_0$ multipliers, the second PE being associated with the third buffer and the second buffer, wherein the control logic circuit is coupled to the third buffer, and the control logic circuit being further configured to select a second nonzero-valued a element in the first buffer based a second zero-valued a element being in a first column of the third buffer and to replace the second zero-valued a element in the first column of the third buffer with the second nonzero-value a element in the first buffer, the second nonzero-valued a element being selected from within the maximum borrowing distance of a second location of the second zero-valued a element, and wherein the second PE is configured to receive a elements from the first column of the third buffer including the second nonzero-valued a element selected to replace the second zero-value a element in the first column of the third buffer and to receive b elements from locations in the second buffer that correspond to locations in the third and the first buffers from where the a elements have been received by the second PE.

15. A general matrix-matrix (GEMM) accelerator core, comprising:

a first buffer comprising $K_0$ rows and $K_1$ columns of locations, the first buffer being configured to receive a elements of a first matrix A of activation values, and $K_0$ and $K_1$ being integers greater than 1;

a second buffer comprising $K_1$ rows and $K_0$ columns of locations, the second buffer being configured to receive b elements of a second matrix B of weight values, the second matrix B being preprocessed to replace zero-valued elements of matrix B with nonzero-valued elements of second matrix B;

a third buffer comprising $K_0$ rows and $K_1$ columns of locations, the third buffer being configured to receive a elements of the first matrix A of activation values;

a control logic circuit coupled to the first buffer and the third buffer, the control logic circuit being configured to select a first nonzero-valued a element based a first zero-valued a element being in a first column of the first buffer and to replace the first zero-valued a element with the first nonzero-value a element, the first nonzero-valued a element being selected from within a maximum borrowing distance of a first location of the first zero-valued a element in the first column of the first buffer, and the control logic circuit being further configured to select a second nonzero-valued a element in the first buffer based a second zero-valued a element being in a first column of the third buffer and to replace the second zero-valued a element with the second nonzero-value a element, the second nonzero-valued a element being selected from within a maximum borrowing distance of a second location of the second zero-valued a element;

a first processing element (PE) comprising an array of $K_0$ multipliers, the first PE being associated with the first buffer and the second buffer, and being configured to receive a elements from the first column of the first buffer including the first nonzero-valued element a selected to replace the first zero-valued element a and to receive b elements from locations in the second buffer that correspond to locations in the first buffer from where the a elements have been received by the first PE; and a second PE comprising an array of $K_0$ multipliers, the first PE being associated with the third buffer and the second buffer, the second PE being configured to receive a elements from the first column of the third buffer including the second nonzero-valued a element selected to replace the second zero-value a element and to receive b elements from locations in the second buffer that correspond to locations in the third and the first buffer from where the a elements have been received by the second PE.

16. The GEMM accelerator core of claim 15, wherein the first PE is further configured to multiply the a elements received from the first column of the first buffer and the b elements received from the second buffer, and wherein the second PE is further configured to multiply the a elements received from the first column of the third buffer and the b elements received from the second buffer.

17. The GEMM accelerator core of claim 15, wherein the maximum borrowing distance of the first location comprises a predetermined distance from the first location that is in at least one direction of at least one of three dimensions, and comprises the predetermined distance from the second location that is in at least one direction of at least one of three dimensions.

18. The GEMM accelerator core of claim 15, wherein the second matrix B is preprocessed to replace zero-valued elements of matrix B with nonzero-valued elements of second matrix B.

19. The GEMM accelerator core of claim 15, wherein the control logic circuit is further configured to select the first nonzero-valued element a to replace the first zero-valued a element based on the first nonzero-valued a element having a fewest number of possibilities of replacing a zero-valued a element as compared to a number of possibilities of other nonzero-valued elements that are within the maximum borrowing distance of the first location of the first zero-valued a element.

20. The GEMM accelerator core of claim 15, wherein the control logic circuit is further configured to select the second nonzero-valued element a to replace the second zero-valued a element based on the second nonzero-valued a element having a fewest number of possibilities of replacing a zero-valued a element as compared to a number of possibilities of other nonzero-valued elements that are within the maximum borrowing distance of the second location of the second zero-valued a element.

* * * * *